United States Patent [19]
Patil et al.

[11] Patent Number: 5,278,241
[45] Date of Patent: Jan. 11, 1994

[54] AMINO-SUBSTITUTED POLYMERS CONTAINING GRAFT POLYMER SEGMENTS DERIVED FROM AROMATIC NITROGEN-CONTAINING MONOMERS

[75] Inventors: Abhimanyu O. Patil, Westfield; Sudhin Datta, Matawan; Robert D. Lundberg, Bridgewater, all of N.J.

[73] Assignee: Exxon Chemical Patents Inc., Linden, N.J.

[21] Appl. No.: 559,760

[22] Filed: Jul. 30, 1990

[51] Int. Cl.$^5$ .................................................. C08F 8/32
[52] U.S. Cl. ................................. 525/274; 525/326.6; 525/379
[58] Field of Search ................... 525/326.6, 274, 379

[56] References Cited

U.S. PATENT DOCUMENTS

| | | | |
|---|---|---|---|
| 3,492,277 | 1/1970 | Clark | 260/88.1 |
| 3,761,458 | 9/1973 | Holler et al. | 260/89.7 N |
| 3,796,687 | 3/1974 | Collette et al. | 260/47 UA |
| 3,884,888 | 5/1975 | Collette et al. | 260/80.78 |
| 3,901,860 | 8/1975 | Collette et al. | 260/80.78 |
| 4,017,669 | 4/1977 | Collette et al. | 526/169 |
| 4,139,417 | 2/1979 | Marie et al. | 252/51.5 A |
| 4,423,196 | 12/1983 | Arlt et al. | 526/72 |
| 4,604,427 | 8/1986 | Roberts et al. | 525/185 |

FOREIGN PATENT DOCUMENTS

| | | |
|---|---|---|
| 0806736 | 2/1969 | Canada . |
| 0295076 | 6/1988 | European Pat. Off. . |
| 0314311 | 5/1989 | European Pat. Off. . |
| 0314845 | 5/1989 | European Pat. Off. . |
| 7337756-R | of 1969 | Japan . |
| 0152767 | of 1982 | Japan . |
| 0188996 | of 1982 | Japan . |
| 0188997 | of 1982 | Japan . |

OTHER PUBLICATIONS

F. Wudl et al., "Poly(p-phenyleneamine): Synthesis and Comparison to Polyaniline," *JACS* 109, 3677–3684 (1987).

M. Angelopoulos et al., "Polyaniline: Solutions, Films and Oxidation State," *Mol. Cryst. Liq. Cryst.* 160, 151–163 (1988).

A. Andreatta et al., "Electrically–Conducted Fibers of Polyaniline Spun From Solutions in Concentrated Sulfuric Acid," *Syn. Met.* 26, 383–389 (1988).

S. Li, "Synthesis and Characterization of Soluble Polyaniline," *Syn. Met.* 29 (E329–E336) (1989).

S. P. Armes et al., "The Synthesis of Polymeric Surfactants for the Preparation of Sterically–Stabilized Polyanile Colloids," *Polym. Mater. Sci. Eng.* 60, 751–753 (1989).

A. G. MacDiarmid et al., "The Polyanilines: Processing, Molecular Weight, Oxidation State and Derivatives," *Polymer Pre-prints* 30, 147–48 (1989).

A. Ray et al., "Polyaniline: Doping, Structure and Derivatives," *Synth. Met.* 29, 141–150 (1989).

S. P. Armes et al., "Novel Colloidal Dispersions of Polyaniline," *J. Chem. Soc., Chem. Commun.* 88–89 (1989).

Y. Wei et al., "Synthesis and Electrochemistry of Alkyl Ring–Substituted Polyanilines," *J. Phys. Chem.* 93, 495–499 (1989).

(List continued on next page.)

*Primary Examiner*—Bernard Lipman
*Attorney, Agent, or Firm*—J. B. Murray, Jr.; T. V. Kowalchyn

[57] ABSTRACT

The novel polymers of the present invention are prepared by graft polymerization of at least one aromatic nitrogen-containing monomer onto a low $T_g$ amino-substituted polymer (e.g., an ethylene alpha-olefin interpolymer substituted by primary amino or secondary amino groups). Preferred aromatic nitrogen-containing moieties are illustrated by aniline, and preferred low $T_g$ amino-substituted interpolymers comprise amino-substituted ethylene propylene norbornene elastomeric terpolymers. The polymers of this invention are useful in electrical, textile and other applications.

54 Claims, No Drawings

OTHER PUBLICATIONS

S. K. Manohar et al., "N-Substituted Derivatives of Polyaniline," *Syn. Met. 29,* 349–56 (1989).

Matsumura, K. and Fukumoto, O., *J. Pol. Sci.,* 9, 471–483 (1971).

Spevak, L. L.; Ivanochev, S. S.; et al., "Copolymerization of Ethylene with Acrylic Acid and Its Derivatives Using the Catalyst System $Al(C_2H_5)_2ClVO(OC_2H_5)_3$" (Sci.-Ind. Enterp. Plastpolim, Leningrad, USSR), *Plaste Kautsch,* 29(1), 12–15, 1982. (abstract only).

W. Huang et al., "Polyaniline, A Novel Conducting Polymer," *J. Chem. Soc.,* Faraday Trans. 1, 82, 2385–2400 (1986).

F. L. Lu et al., "Phenyl-Capped Octaaniline (COA): An Excellent Model for Polyaniline," *JACS 108,* 8311–8313 (1986).

S. Li et al., *Synth. Met.* 20(2), 141–9 (1987).

T. Kobayashi et al., "Polyaniline Film-Coated Electrodes as Electrochromic Display Devices," *J. Electroanal. Chem.* 161, 419–423 (1984).

A. G. MacDiarmid et al., "'Polyaniline': Interconversion of Metallic and Insulating Forms", *Mol. Cryst. Liq. Cryst.,* 121, 173–180 (1985).

Y. Cao et al., "Spectroscopic and Electrical Characterization of Some Aniline Oligomers and Polyaniline," *Syn. Met.* 16, 305–315 (1986).

AMINO-SUBSTITUTED POLYMERS CONTAINING GRAFT POLYMER SEGMENTS DERIVED FROM AROMATIC NITROGEN-CONTAINING MONOMERS

BACKGROUND OF THE INVENTION

1. Field of the Invention

The present invention relates to a process for forming an oil-soluble polyaniline-grafted polymers useful as electrically conducting polymers in electrical applications.

2. Discussion of Background

Polyaniline is one of the oldest polymers known, and has been prepared in the form of emeraldine hydrochloride by oxidizing an aqueous hydrochloric acid solution of aniline with ammonium peroxy disulfate at ambient temperature. Polyaniline is a cheap, highly electrically conducted polymer, but is processable with difficulty in its powder form. Conventionally, making such conjugated conducting polymers oil-soluble and processible has been a very difficult problem.

S. Li et al., Synth. Met. 20(2), 141–9 (1987) discloses the graft polymerization of polyaniline with polyaminostyrene to form polyaniline soluble in common organic solvents (DMF and DMSO, and slightly soluble in methanol and trichloromethane). This procedure involved the nitration of polystyrene (of 120,000 molecular weight) with either fuming nitric acid or a chloroform solution of 100% nitric acid and acetic anhydride. The resulting polynitrostyrene was hydrogenated with phenylhydrazine under nitrogen to form the polyaminostyrene.

S. Li, "Synthesis and Characterization of Soluble Polyaniline," Syn. Met. 29 (E329-E336) (1989) reports three general synthetic routes for the solubilization of polyaniline in DMF and DMSO. The experimental synthesis employed either formation of block polyaniline (employing either para-aminobenzenesulfonyl-chloride/poly(ethylene glycol) reaction products or para-aminobenzoyl chloride/poly(ethylene glycol) reaction products, and the preparation of graft polyanilines by polymerization of aniline on polyaminostyrene, polyacrylamides or polyepichlorohydrin.

S. P. Armes et al., "The Synthesis of Polymeric Surfactants for the Preparation of Sterically-Stabilized Polyaniline Colloids," Polym. Mater. Sci. Eng., 60, 751–753 (1989) discloses copolymerization of 2- or 4-vinyl pyridine with para-aminostyrene.

T. Kobayashi et al., "Polyaniline Film-Coated Electrodes as Electrochromic Display Devices," J. Electroanal Chem. 161, 419–423 (1984) discloses evaluations of the electrochromic properties of polyaniline films.

A. G. MacDiarmid et al., "'Polyaniline': Interconversion of Metallic and Insulating Forms," Mol. Cryst. Liq. Cryst., 121, 173–180 (1985) describes the synthesis of polyaniline powder and the conversion of this material to various insulating and metallic forms by acid/base and oxidation/reduction mechanisms.

Y. Cao et al., "Spectroscopic and Electrical Characterization of Some Aniline Oligomers and Polyaniline," Syn. Met. 16, 305–315 (1986) describes the preparation of aniline oligomers and polyaniline, and proton-doped derivatives.

W. Huang et al., "Polyaniline, a Novel Conducting Polymer," J. Chem. Soc., Faraday Trans. 1, 82, 2385–2400 (1986) discloses the chemical synthesis of polyaniline and electrochemical synthesis of polyaniline from aniline.

F. L. Lu et al., "Phenyl-Capped Octaaniline (COA): An Excellent Model for Polyaniline," JACS 108, 8311–8313 (1986) discloses the preparation of a monodispersed polyaniline of molecular weight of 806 and its conversion to a partially oxidized form.

F. Wudl et al., "Poly(p-phenyleneamine): Synthesis and Comparison to Polyaniline," JACS 109, 3677–3684 (1987) discloses the preparation of small polyaniline oligomers by a double condensation of para-phenyl amino-substituted anilines with diethyl succinoyl succinate and the preparation of poly(p-phenaline amine) by the reaction of succino succinic acid (2,5-dioxo-1,4-cyclohexane dicarboxylic acid) and p-phenyline diamine.

A. G. MacDiarmid et al., "The Polyanilines: Processing, Molecular Weight, Oxidation State and Derivatives," Polymer Pre-prints 30, 147–48 (1989); M. Angelopoulos et al. "Polyaniline: Solutions, Films and Oxidation State," Mol. Cryst. Lig. Cryst. 160. 151–163 (1988); A. Andreatta et al., "Electrically-Conducted Fibers of Polyaniline Spun From Solutions in Concentrated Sulfuric Acid," Syn. Met. 26, 383–389 (1988); A. Ray et al., "Polyaniline: Doping, Structure and Derivatives," Synth. Met. 29, 141–150 (1989); S. P. Armes et al., "Novel Colloidal Dispersions of Polyaniline," J. Chem. Soc., Chem. Commun. 88–89 (1989) also relate to preparation of polyaniline.

Y. Wei et al., "Synthesis and Electrochemistry of Alkyl Ring-Substituted Polyanilines," J. Phys. Chem. 93, 495–499 (1989) discloses the synthesis of poly(o-toluidine), poly(m-toluidine) and poly(o-ethylaniline), by chemical and electrochemical syntheses.

S. K. Manohar et al., "N-Substituted Derivatives of Polyaniline," Syn. Met. 29, 349–56 (1989) discloses the preparation of N-methylated polyaniline.

U.S. Pat. No. 4,604,427 relates to forming electrically conducting polymer blends by impregnating a preformed host polymer with a cyclic monomer such as aniline and then exposing the mixture with a chemical oxidant to form the conductive polymer reaction product within the surface layer of the host polymer.

Canadian Patent 806,736 relates to an antioxidant for hydrocarbon-type rubber which is in the form of an aromatic polymer having repeating units which consist of an NH-group attached to a difunctional aromatic group prepared by reacting either hydroquinone or para-benzoquinone with various aromatic diamines, such as para-phenylene diamine and 2,7-diamino naphthylene (page 4). The antioxidant activity of exemplary polymers were demonstrated in ethylene-propylene copolymer rubber vulcanisate (pages 7–8).

European Patent Publication 314,311 relates to the preparation of conducting articles by (a) forming a gel of a carrier polymer in a compatible solvent, (b) polymerizing a selected monomer within the gel, and (c) doping the article so provided. Disclosed carrier polymers include high molecular weight (M.W.>100,000) flexible chain polymers, such as polyethylene, isostatic polypropylene, poly(ethylene oxide) and polystyrene, and lower molecular weight polymers (10,000–100,000) having "rigid-rod" molecules, such as aramid polymers, aromatic polyesters, PBT and PBI. The polymerization step (b) can include oxidative-coupling polymerization employing aniline. The polymerization step results in the formation, within the carrier polymer, of a normally intractable polymeric material derived from the selected monomer.

European Patent Publication 314,845 discloses graft copolymers characterized by oil-soluble substantially linear, carbon-carbon backbone polymer having graft polymerized thereon units derived from $RNH_2$ monomer, wherein R is a hydrocarbon containing a polymerizable ethylenically unsaturated double bond. Illustrated amine monomers include p-aminostyrene and p-(aminomethyl) styrene.

Polymers prepared from alpha-olefins using Ziegler catalysts have found acceptance for use in a wide range of applications including elastomers, fibers and films. Inasmuch as the polymers are essentially nonpolar, however, they have a characteristic inertness which makes them difficult to surface treat, for example, by dyeing or metallizing techniques. Additionally, they are limited in the amount of additives, such as stabilizers and plasticizers which they can accommodate without "blooming". Similar limitations are found in the rubbery copolymers and terpolymers produced from alpha-olefins.

In an attempt to overcome these disadvantages, efforts have been made to introduce polar functional groups into such polyolefins, both homo and copolymers. Previous efforts in this direction have included both the direct incorporation of functionalized monomers during the polymerization process as well as post-polymerization functionalization of polymers.

Efforts have been made to incorporate polar monomers directly into the polymer using various techniques. U.S. Pat. No. 3,492,277 discloses a method for forming a complex of a polar monomer containing a labile hydrogen, as in $-NH_2$, $-COOH$, or $-OH$, by contacting the polar monomer in an inert hydrocarbon solvent with an organoaluminum compound at a molar ratio of polar monomer to organo-aluminum compound of from 1:1 to 1:3, and then heating the solution to between 60° and 150° C. The organic aluminum compounds disclosed have the general formulas $AlR_1R_2R_3$ or $AlR_1R_2X'$ wherein $R_1$, $R_2$ and $R_3$ are the same or different alkyl or aryl radicals and $X'$ is either chlorine or bromine. The method disclosed is alleged to be useful with a wide range of monomers including those having polar groups such as $-COOR'$, $-CHO$, $-SH$ and $-SO_3H$. The polar monomers have the general formula:

$$CH_2=CH-(CH_2)_n-\overset{Z}{\underset{|}{CH}}-R$$

wherein n is an integer greater than 2, R is hydrogen, an alkyl or aryl radical, and Z is the polar moiety. Z can also be an aromatic nucleus bearing such moieties. Although $R_1$, $R_2$ and $R_3$ are generally described as being the same or different aryl or alkyl radicals, this patent does not disclose that non-halogenated organoaluminum compounds affect the results achieved and otherwise disclose and illustrate the procedure by way of examples wherein a halogenated organoaluminum compound is used.

Reaction of the organoaluminum compound with the polar monomer results in a polar monomer reaction product complex, e.g. 5-hydroxy-1-pentene and diethyl aluminum chloride

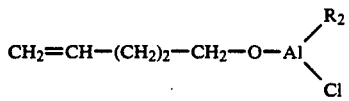

with the elimination of an alkyl or aryl radical from the organoaluminum compound. The complex can then be combined with alpha-olefin and Ziegler catalyst (titanium trichloride) for the polymerization. The polymerization is carried out at about 60° C. to about 100° C. The ratio of the preferred aluminum compound, diethylaluminum chloride, to titanium trichloride is 10:1 to 1:1.

U.S. Pat. No. 4,423,196 discloses a method of incorporating acyclic polar monomers into an alpha-olefin copolymer using an aluminum compound of the formula $AlR_nX'_{(3-n)}$ wherein R is a $C_1$-$C_{18}$ alkyl group, $X'$ is halogen and $0<n\leq3$. The polar monomer is contacted at room temperature with one mole of organoaluminum compound, and then allowed to react for 1 hour at 70° C. Polymerization is carried out using $TiCl_3$ as the Ziegler catalyst, the ratio of organoaluminum to $TiCl_3$ is 1:1 to 100:1. Polymerization is carried out at about 20° C. to 100° C. and preferably about 60° C. to 90° C. Illustrative of the polar monomers disclosed are eugenol and undec-1-enoic acid. The disclosure of EPO Patent Application No. 14,822 is similar in scope, but also discloses ethylene as a compound considered to be an alpha-olefin.

Matsumura, K. and Fukumoto, O., *J. Pol. Sci.*, 9, 471–483 (1971) discloses the copolymerization of propylene using a Ziegler-Natta type catalyst (equimolar quantities of $TiCl_3$ and triethyl aluminum) in the presence of ethylchloro-aluminum acrylate, which was formed by the reaction of acrylic acid with diethyl aluminum chloride under $N_2$ at room temperature with cooling.

An article by Spevak, L. L.; Ivanochev, S. S.; et al. entitled, "Copolymerization of Ethylene with Acrylic Acid and Its Derivatives Using the Catalyst System Al $(C_2H_5)_2Cl-VO(OC_2H_5)_3$" (Sci.-Ind. Enterp. "Plastpolim", Leningrad, USSR), *Plaste Kautsch*, 29(1), 12–15, 1982, discloses the preparation of ethylene/acrylic acid copolymers. An excess of organo aluminum compound is utilized both to complex the acrylic acid and to act as a cocatalyst for the $AlEt_2Cl-VO(OEt)_3$ polymerization catalyst system. Complexing of the acrylic acid is accomplished in situ during the polymerization process.

U.S. Pat. No. 3,796,687 discloses the preparation of ethylene-alpha-olefin-nonconjugated diene terpolymers using as a fourth monomer a polar compound of the formula: $CH_2=CH-(CH_2)_n-Y$ wherein n is an integer from 0 to 20 and Y is a functional group which can be

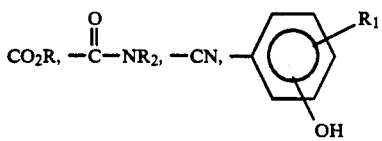

and $-SO_2Cl$ wherein R is H, alkyl, aryl or cycloalkyl containing 1 to 18 carbon atoms and $R_1$ is either $-R$ or $-OR$. Other polar compounds disclosed include bridged ring compounds (substituted norbornene) and substituted aromatic compounds. The substituents include those described above as well as alcohols. The polymerization catalyst comprises a vanadium compound and an organoaluminum cocatalyst in conjunction with a halogenated compound (e.g., hexachloropropylene) as catalyst reactivator. The ratio of aluminum compound to vanadium compound is at least 2:1 preferably 10:1. The polymerization is conducted by dissolving ethylene and a comonomer alpha-olefin in the reaction solvent, the alkylaluminum compound is then added, followed by addition of the unsaturated functional monomer and any diene, then any catalyst reactivator, and finally the the vanadium compound.

U.S. Pat. Nos. 3,884,888, 3,901,860, and 4,017,669 are related to U.S. Pat. No. 3,796,687 and have substantially the same disclosures. U.S. Pat. No. 3,884,888 is directed to EPDM which contains as a fourth monomer, a bridged ring compound, e.g., norbornene substituted with a group defined as being —$(CH_2)_n$—Z where n is 0 to 20 and Z is —$NH_2$, —COOH,

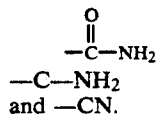

—C—$NH_2$
and —CN.

U.S. Pat. No. 3,901,860 toward EPDM wherein the substituent is similar to that of U.S. Pat. No. 3,884,888 except that Z is COOH. U.S. Pat. No. 4,017,669 claims as the fourth monomer the same bridged ring structure of U.S. Pat. No. 3,884,888 and U.S. Pat. No. 3,901,860 except that the substituent is —$(CH_2)_n$—COOR, wherein n is 0-20 and R can be alkyl, aryl, or cycloalkyl.

Japanese Patent No. JA 7337756-R discloses the copolymerization of an alpha-olefin with an unsaturated carboxylic acid of the formula $CH_2=CH—(CH_2)_n$—COOH. The polymerization catalyst is a halide of Ti or V and an organoaluminum compound. The organoaluminum compound can be of the formula $R_3Al$, $R_2AlX$, $RAlX_2$ $R_2AlOR'$, $RAl(OR')X$ and $R_3Al_2X_3$ where R and R' are alkyl or aryl and X is halogen. The polymerization is effected at 0°-130° C. and 0-50 atmospheres. There is no prereaction of the aluminum compound with the carboxylic acid compound.

U.S. Pat. No. 3,761,458 discloses a process applicable to alpha-olefin containing polar monomers in which the polar groups are separated from the alpha-olefin by two or more carbon atoms. The polar monomer can contain more than one polar group. The polar group can be one of the amino, cyano, phosphine, (hydrocarb)oxy, metal-metalloid-containing groups, as well as metal salts of acid groups such as —COOH, —$SO_3H$, —PO(OR)OH, carboxyl groups, or hydrocarbyl sulfide groups. An essential component of the catalyst system is the halide or alkoxyhalide of a transition metal e.g., $TiCl_3$. The preferred cocatalyst is an aluminum alkyl. Other catalysts include vanadium trichloride, zirconium tetrachloride etc. The aluminum compound has the formula $AlR_3$ or $RR'AlX$ wherein R is hydrocarbyl, R' is H or hydrocarbyl and X is halogen, H, alkoxy, aryloxy etc. All monomers and catalyst components are added to the reaction and there is no preference as to order of addition of the monomers. The preferred alkyl groups of the catalyst component is ethyl, but n-propyl, isopropyl, n-butyl, isobutyl, n-octyl or 2-ethyhexyl groups are taught as suitable.

U.S. Pat. No. 4,139,417 discloses amorphous copolymers of mono-olefins or of mono-olefins and non-conjugated dienes with unsaturated derivatives of imides. The polymer comprises about 99.9 to 80 weight percent of non-polar units derived from at least two mono-olefins containing 2 to 18 carbon atoms, particularly ethylene and propylene, and optionally one more non-conjugated diene. In the preparation of the polymer the imide is complexed with a Lewis acid, e.g. alkylaluminum dihalides, aluminum trihalides, boron halides, nickel halides. It is indicated that the Lewis acid-imide complex has a higher stability than that of the reaction products which the non-saturated imide may form with components of the coordination catalyst system used for the copolymerization. The complex between the Lewis acid and the unsaturated imide may be formed before being introduced into the polymerization zone, by dissolving the imide and Lewis acid in an inert solvent maintained at −80° C. to +80° C. Catalyst systems which are disclosed as being particularly suitable for the preparation of the copolymers are formed by the association of an organoaluminum compound with titanium, vanadium, tungsten or zirconium derivatives e.g. halides or oxyhalides. The organoaluminum compound may have the formula $$AlY_nCl_{(3-n)}$$

wherein n is 1, 3/2, 2 or 3 and Y is a lower alkyl group, e.g., $C_2$–$C_6$ alkyl, the aluminum compound being associated with a titanium halide, vanadium halide or vanadium oxyhalide.

Japanese Patent Application No. 188996/1982 (Laid Open No. 80413/1984; May 9, 1984) discloses a process for preparing a copolymer of an olefin and a polar vinyl monomer which comprises copolymerizing an olefin with a complex of the polar vinyl monomer and a Lewis acid. The amount of Lewis acid is in excess of an equimolar amount of polar monomer. The Lewis acid is represented by the general formula $R_mMX_n$ wherein R is a hydrocarbyl group; M is B, Al or Sn; X is halogen, and n is greater than zero. Illustrative of the Lewis acid are ethylaluminum dichloride, aluminum chloride, boron trichloride and tin chloride. The polar vinyl monomer is an ester of an unsaturated alcohol and an organic acid. The catalyst component used in the copolymerization process comprises magnesium, titanium, halogen and an electron donor. It is prepared by heating or copulverizing a combination of magnesium or a magnesium compound, a titanium compound and an electron donor.

Japanese Patent Application No. 152767/1982 (Laid Open No. 43003/1984, May 19, 1984) is similar in scope to Japanese Application No. 188997/1982. The catalyst of Japanese Patent Application No. 152767/1982 however, comprises a reduced titanium tetrachloride with an organoaluminum compound activated by an electron donor such as ether, ester, amine and/or a halogen containing compound. Illustrative of halogen containing compounds are the tetrachlorides of titanium, silicon and tin; hydrogen halide, halogens and halogenated hydrocarbon.

European Patent Application No. 295,076 relates to polyolefins incorporating carboxyl, hydroxyl, thio, amino, carbonyl and imino functional groups, masked functional group-containing monomers and methods for preparing the same, by reacting the functional group containing monomers with non-halogenated organometallic compounds to form masked, functional-group containing monomers, and polymerizing polymer chain monomers with the masked monomers to produce a polymer chain.

SUMMARY OF THE INVENTION

The novel polymers of the present invention are prepared by graft polymerization of (B) at least one aromatic nitrogen-containing monomer onto (A) a low $T_g$ amino-substituted polymer (e.g., an ethylene alpha-olefin interpolymer) substituted by primary amino or secondary amino groups. Preferably, the low $T_g$ amino-substituted polymer is oil soluble. Preferred aromatic nitrogen-containing monomers (B) are illustrated by aniline, and preferred amino-substituted interpolymers (A) comprise amino-substituted ethylene propylene norbornene terpolymers. Such preferred low $T_g$ amino-substituted interpolymers can be prepared by co-polymerizing ethylene (and, optionally, an alpha-olefin) with a masked nitrogen-containing monomer wherein the primary or secondary nitrogen group of the nitrogen-containing monomer is masked with an organometallic compound (preferably, a non-halogenated organometallic compounds), followed by deashing the resulting interpolymer product mixture to remove the organometallic compound and thereby form the low $T_g$ amino-substituted interpolymer. Other useful low $T_g$ amino-substituted polymers can be prepared by halogenation of a polyolefin, followed by amination of the halogenated polyolefin.

One object of the present invention is the production of polyaniline-grafted olefin polymers including polymer chain monomers and nitrogen-containing monomers having a substantially uniform level of functionality among the polymer chains.

A still further object of the present invention is the production of polyaniline-grafted olefin polymers including polymer chain monomers and nitrogen-containing monomers which are essentially devoid of organic halides.

Another object of the present invention is to provide a method for forming a polyaniline-grafted polymer chain of polymer chain monomers and nitrogen-containing monomers which involves reacting a nitrogen-containing monomer with a non-halogenated metallic compound to form a masked, nitrogen-containing monomer, polymerizing polymer chain monomers with the masked nitrogen-containing monomers to produce the low $T_g$ polymer chain containing primary or secondary amine groups and polymerizing aniline thereon.

Another further object of the present invention is to provide a method for forming a polyaniline-grafted polymer chain of olefins, referred to herein as polymer chain monomers, and nitrogen-containing monomers, which involves (a) reacting (i) nitrogen-containing monomers having a general formula of:

$$R^1(X)_n$$

wherein $R^1$ is selected from the group consisting of ethylenically unsaturated hydrocarbyl radicals, n is an integer, and X is selected from the group consisting of primary amino, secondary amino, imino groups, and cyano with (ii) non-halogenated metallic compounds to form masked, nitrogen-containing monomers; (b) polymerizing polymer chain monomers with the masked, nitrogen-containing monomers to produce the low $T_g$ polymer chain, containing primary or secondary amine groups; and (c) polymerizing aniline thereon.

The non-halogenated metallic compound used for purpose of the present invention is an organometallic compound of the formula:

$$M(Y)_r$$

wherein M is a member selected from Group IIA, IIB, IIIA, IVA, and the transition metal elements and is preferably an element selected from a group consisting of aluminum, magnesium, and zinc, and wherein r is an integer from 1 to 4 and is selected so as to satisfy the valence for metal M, and Y is at least one of $R^2$, $R^3$, $R^4$ and $R^5$, wherein $R^2$—$R^5$ are (preferably independently) selected from the group consisting of hydrogen and $C_1$-$C_{16}$ hydrocarbyl, which may or may not contain unsaturation, including $C_1$-$C_{16}$ alkyl, $C_6$-$C_{16}$ aryl, $C_1$-$C_{16}$ alkoxy, provided that at least one of $R^2$—$R^5$ is not hydrogen. Exemplary of preferred $R^2$—$R^5$ groups are members selected from the group consisting of hydrogen, methyl, ethyl, diethyl, propyl, isopropyl, butyl, isobutyl, tertiary butyl, pentyl, and hexyl, and phenyl. Suitable organometallic compounds are diethylzinc, and di-n-hexylmagnesium, with triisobutylaluminum, triethylaluminum, and diisobutyl aluminum hydride being preferred.

DETAILED DESCRIPTION OF THE PREFERRED EMBODIMENTS

Preparation of the Low $T_g$ Amino-Substituted Polymer (A)

The low $T_g$ amino-substituted polymers used in this invention comprise nitrogen-containing polymers characterized by a glass transition temperature ($T_g$) of not greater than about $+25°$ C., preferably not greater than about $0°$ C., and more preferably not greater than about $-15°$ C. As used herein $T_g$ is the value as measured by ASTM Method D-3418. Usually, the low $T_g$ amino-substituted polymers will have a $T_g$ of from about $-100°$ to $+20°$ C., and preferably from about $-75°$ to $-20°$ C.

Preferably, the low $T_g$ amino-substituted polymer will have within its structure, on average, at least 0.5 (e.g., from 0.5 to 20), and more preferably at least 1 (e.g., from 1 to 15) reactive amine groups (i.e., primary and/or secondary amine groups) per polymer chain.

The low $T_g$ amino-substituted polymer can be substituted by an average of one or more nitrogen-containing group per polymer chain and such nitrogen-containing group(s) can contain one or more nitrogen atoms per group.

The low $T_g$ amino-substituted polymers used in this invention will be preferably characterized by a carbon to nitrogen atom ratio of at least about 10:1 (e.g. from 10:1 to 2000:1, or more), and preferably at least about 100:1. A parlticularly preferred C:N ratio for the low $T_g$ polymers is from about 100:1 to 900:1.

The low $T_g$ amino-substituted polymer backbone can comprise hydrocarbon polymers including polymers selected from the group consisting of homopolymers of $C_3$ to $C_{25}$ (preferably $C_3$ to $C_{10}$) alpha-olefins, copolymers of $C_2$ to $C_{25}$ (preferably $C_2$ to $C_{10}$) alpha-olefins, and terpolymers and other interpolymers of $C_2$ to $C_{25}$ (preferably $C_2$ to $C_{10}$) alpha-olefins.

The low $T_g$ amino-substituted polymer include low $T_g$ amino-substituted interpolymers prepared by the direct incorporation of masked, nitrogen-containing monomers (MNCM) into homopolymers and copolymers, such as polyolefins and particularly ethylene-propylene copolymers (EPM), to form copolymers, terpolymers and tetrapolymers containing the MNCM. The nitrogen-containing monomer (NCM) is an unsaturated compound which is copolymerizable with polymer chain monomers (PCM), viz. olefins such as ethylene and propylene (described in more detail below), using a Ziegler catalyst. The nitrogen-containing monomer is preferably masked in a reaction with non-halogenated metallic compounds under controlled conditions and is then contacted with polymer chain monomers for production of the low $T_g$ amino-substituted interpolymer. The low $T_g$ amino- substituted elastomeric polymers preferably comprise polymer chains exhibiting a generally uniform distribution of amino functionality and a low halogen content and are essentially devoid of organic halides.

Polymer Chain Monomers

The term polymer chain monomer (PCM) as used in the specification and claims includes conventional monomers normally used in the production of polymers. The polymer chain monomers used in the method for forming a low $T_g$ amino-substituted interpolymer in accordance with the present invention are preferably selected from a group consisting of ethylene and $C_3$–$C_{25}$ alpha-olefins. The alpha-olefins suitable for use may be branched or straight chained, cyclic, and aromatic substituted or unsubstituted, and are preferably $C_3$–$C_{16}$ alpha-olefins. Mixed olefins can be used (e.g., mixed butenes).

The alpha-olefins, when substituted, should not be aromatic substituted on the 2-carbon position (e.g., moieties such as $CH_2=CH-\phi-$ should not be employed), since such an aromatic group interferes with the subsequent desired polymerization. Illustrative of such substituted alpha-olefins are compounds of the formula $H_2C=CH-C_bH_{2b}-T$ wherein "b" is an integer from 1 to 20 carbon atoms (preferably to 10 carbon atoms), and T comprises aryl, alkaryl, or cycloalkyl. Exemplary of such T substituents are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like), alkaryl of 7 to 15 carbon atoms (e.g., tolyl, xylyl, ethylphenyl, diethylphenyl, ethyl-naphthyl, and the like). Also useful are alpha-olefins substituted by one or more such X substituents wherein the substituent(s) are attached to a non-terminal carbon atom, with the proviso that the carbon atom so substituted is not in the 1- or 2-carbon position in the olefin, in addition to alkyl-substituted bicyclic and bridged alpha-olefins of which $C_1$–$C_9$ alkyl substituted norbornenes are preferred (e.g., 5-methyl2-norbornene, 5-ethyl-2-norbornene, 5-(2'-ethylhexyl)2-norbornene, and the like).

Illustrative non-limiting examples of preferred alpha-olefins are propylene, 1-butene, 1-pentene, 1-hexene, 1-octene, and 1-dodecene. The alpha-olefin is generally incorporated into the low $T_g$ amino-substituted interpolymer in an amount of about 10 to about 90 wt %, more preferably at about 20 to about 70 wt %. The low $T_g$ amino-substituted interpolymer may optionally contain a third type of polymer chain monomer which is an easily polymerizable non-conjugated diene. Non-conjugated dienes suitable for purposes of the present invention can be straight chain, hydrocarbon di-olefins or cycloalkenylsubstituted alkenes, having about 6 to about 15 carbon atoms, for example:

(a). straight chain acyclic dienes, such as 1,4-hexadiene and 1,6-octadiene;

(b). branched chain acyclic dienes, such as 5-methyl-1, 4-hexadiene; 3,7-dimethyl-1,6-octadiene; 3,7-dimethyl-1,7-octadiene; and the mixed isomers of dihydromyricene and dihydro-ocinene;

(c). single ring alicyclic dienes, such as 1,3-cyclopentadiene; 1,4-cyclohexadiene; 1,5-cyclo-octadiene and 1,5-cyclododecadiene;

(d). multi-ring alicyclic fused and bridged ring dienes, such as tetrahydroindene; methyl-tetrahydroindene; dicyclopentadiene; bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclo pentenyl)-2-norbornene, 5-cyclohexylidene-2-norbornene, and 5-vinyl-2-norbornene;

(e). cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, 1,4-hexadiene, 5-methylene-2-norbornene, and 5-ethylidene-2-norbornene. Particularly preferred diolefins are 5-ethylidene-2-norbornene (ENB) and 1,4-hexadiene. The non-conjugated diene is incorporated into the low $T_g$ amino-substituted interpolymer in an amount of from about 0.5 to about 15 wt %; more preferably, from about 1 to about 10 wt %, e.g., 5 wt %.

Nitrogen-Containing Monomers

As used in the specification and claims, the term nitrogen-containing monomer (NCM) means the unsaturated, nitrogen-containing monomers of this invention which contain at least one primary amino, secondary amino, imino, and/or cynano group having the general formula:

$$R^1(X)_n$$

wherein $R^1$ is selected from ethylenically unsaturated hydrocarbyl radicals, and X is selected from the group consisting of amino (—N(H)R') groups, imino groups (—CH=N—R'), and cyano (—C≡N) moieties, and wherein n is an integer of at least 1, preferably 1–4, and more preferably 1–2. R' in the above groups can comprise H or hydrocarbyl (preferably H or saturated hydrocarbyl), e.g., of 1 to 15 carbon atoms, and preferably alkyl of 1 to 5 carbon atoms, cycloalkyl of from 3 to 7 carbon atoms, and the like. Exemplary of such amino groups are —NH$_2$ and alkyl amino groups, e.g., —NHCH$_3$, —NHC$_2$H$_5$, —NHC$_3$H$_7$, —NHC$_4$H$_9$, and the like.

The unsaturation in $R^1$ is such that it is easily polymerized by Ziegler catalysts employed in the practice of this invention. As used herein $R^1$ preferably contains from 2 to 25 carbon atoms, and preferably from 2 to 16 carbon atoms. In particular, $R^1$ is selected from the group consisting of radicals derived from ethylene, alpha-olefins, homologues of alpha-olefins, norbornene and homologues of norbornene, or from the group consisting of vinyl and allyl radicals. Representative examples of such unsaturation are alpha-olefin types shown as (a) and the unsaturation in the norbornene system shown as (b):

$$H_2C=CH-(C_mH_{2m})-  \quad (a)$$

$$R''-(C_pH_{2p})-  \quad (b)$$

wherein R" comprises norbornyl, m is an integer of from 1 to 30, and p is an integer of from 1 to 30. Preferably m and p are integers of from 0 to 12. More preferably m is 0, 1, or 2, and p is 1, 2, or 3. It will be understood that the $-C_mH_{2m}-$ and $-C_pH_{2p}-$ groups can be branched or straight chained, and that the norbenene ring can be substituted with the group at the $-C_pH_{2p}-$ group at the C-2 or C-7 position, i.e., R" can comprise bicyclo [2.2.1] hept-5-en-2-yl, or bicyclo [2.2.1]-hept-2-en-7-yl, respectively. $R^1$ preferably contains from 2 to 25 carbon atoms, and is selected preferably from one of the two classes shown in (a) and (b). Suitable examples from the alpha-olefin unsaturation type includes vinyl, allyl and the higher homologues as represented by integral values of m. Suitable examples of the norbornene unsaturation type include norbornene and its higher homologues represented by integral values for p. More preferably, $R^1$ may contain up to 16 carbon atoms. Preferably, n is the number of functionality sites per NCM and has non-zero integral values between 1 and 5, and more preferably between 1 and 3.

The NCM is preferably soluble in the liquid hydrocarbon solvent or diluent selected for use in the subsequent polymerization reaction (e.g., saturated hydrocarbon solvents, such as hexane).

Exemplary of nitrogen-containing monomers are members selected from the group consisting of norbornenyl-methyl amines and imines and preferably 5-norbornenyl-2-methylamine, 5-norbornene-2,3-dimethyla amine, 5-norbornene-2-ethylamine, 5-norbornene-2-(4'-butenyl)imine and the like, and norbornenyl-nitriles, such as 5-norbornene-2-nitrile, 5-norbornene-2,3-dinitrile, and the like.

The NCM may also include multiple functionality, that is the $R^1$ moiety may be substituted by more than one "X" group, in which case the functional "X" groups may be the same or different.

The hydrocarbyl radical in the NCM will preferably be norbornyl, or vinyl, in structure with particular preference for norbornyl functionalized at the C-2 position or alpha-olefins functionalized at the C-3 position. Notwithstanding the previously mentioned preferred unsaturated, nitrogen-containing monomers, it should be understood that the nitrogen-containing groups may be located at other positions on the hydrocarbyl radical component of the monomer, and it will be further understood that mixtures of such nitrogen-containing monomers can be employed, if desired. Also, one or more NCM can be employed in combination with one or more monomer of the formula:

$$R^1(X^1)_{n''}$$

wherein $R^1$ is as defined above, n" is an integer of at least 1 (e.g., 1-4, preferably 1-2) and $X^1$ is selected from the group consisting of $-CO_2H$, $-OH$, $-C(O)R^1$, $-SH$, and $-CN(R^1)_2$ wherein $R^1$ is as defined above.

The nitrogen-containing monomers useful in this invention may be prepared by conventional methods and detailed description of such NCM preparations is not needed for a complete understanding of this invention. For example, 5-norbornene-2-methyl amine can be formed by condensation of alkyl amine and cyclopentadiene as described by K. Alder and E. Windemuth, Ber. 71, 1939 (1938).

Masking Agent

Agents which have been found to be effective in masking nitrogen-containing monomers for purposes of the present invention include metal alkyls and metal alkyl hydrides and comprise at least one organometallic compound selected from the group consisting of compounds of the formula:

$$(Halo)_{r_1}M(Y)_{r_2}$$

wherein M is a member selected from Group IIA, IB, IIB, IIIA, IVA, and the transition metals and elements, $r_1$ and $r_2$ are the same or different, are each integers of from 0 to 4 and are selected so as to satisfy the valence for metal M, "Halo" is Cl, Br or I, and Y is at least one of $R^2$, $R^3$, $R^4$ and $R^5$, wherein $R^2$-$R^5$ are (preferably independently) selected from the group consisting of hydrogen and $C_1$-$C_{16}$ hydrocarbyl and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$ to $C_{16}$ aryloxy, provided that at least one of $R^2$-$R^5$ is not hydrogen. Exemplary of preferred $R^2$-$R^5$ groups are members selected from the group consisting of hydrogen, methyl, ethyl, propyl, isopropyl, n-butyl, isobutyl, tertiary butyl, pentyl, hexyl, phenyl tolyl, ethylphenyl, naphthyl, methoxy, ethoxy, propoxy, hexoxy, pentoxy, phenoxy, methylphenoxy, iso-butoxy and tertiary butoxy. Illustrative of M are elements comprising at least one member selected from the group consisting of Be, Mg, Ca, Sr, Ba, La, Ti, Zr, Hf, V, Nb, Ta, Cr, Mo, W, Mn, Re, Cu, Zn, Cd, Hg, Al, Ga, Sn and Pb. Preferred are members selected from the group consisting of Mg, Ca, Ti, Zr, Cu, Zn, Cd, Hg, Al, Ga, Sn and Pb. Most preferred is Al. Preferably, when $r_1$ is 1 or greater, Halo is Cl. Most preferably, the masking agent is a non-halogenated compound of the above formula wherein $r_1$ is zero, and wherein $r_2$ is an integer of from 1 to 4. Suitable organometallic compounds are diethylzinc, and di-n-hexylmagnesium, triethyl aluminum, triisobutyl aluminum, diisobutyl aluminum hydride, tributyl aluminum, tripentyl aluminum, trioctylaluminum, diethyl aluminum hydride, dibutyl aluminum hydride, dihexyl aluminum hydride, trimethyl aluminum, trihexyl aluminum, tridecyl aluminum, tridodecyl aluminum, trihexadecyl aluminum, decyl aluminum dihydride, isobutyl aluminum dihydride, ethyl aluminum dihydride, didecyl magnesium, dipropyl zinc, propyl zinc hydride, diethoxy aluminum hydride, trimethoxy aluminum, sodium alkyls (e.g., $NaCH_3$, $NaC_3H_7$), methyl magnesium hydride, di(isopropyl) magnesium, di (n-hexyl) calcium, dimethyl [bis(cyclopentadienyl)] titanium, with triisobutylaluminum, triethylaluminum, and diisobutyl aluminum hydride being most preferred. Although the masking effect using zinc and magnesium compounds is acceptable for purposes of the present invention, it has been observed that masking with aluminum compounds is more effective in controlling catalyst poisoning. Accordingly, organoaluminum compounds are preferred over organomagnesium compounds which in turn are more preferable than organozinc compounds.

Masked Functional Group-Containing Monomer

The term masked, nitrogen-containing monomer (MNCM) as used in the specification and claims, is intended to refer to the reaction products formed by the reaction of the nitrogen-containing monomer and a masking agent comprising at least one metallic organic compound (which preferably comprises a non-halogenated metallic organic compound). The masked, nitrogen-containing monomer so formed is used as the actual comonomer in the polymerization process.

The preferred non-halogenated masked nitrogen-containing monomers useful for purposes of the present invention include those having the general formula:

wherein n' is an integer of from 1 to 2, n is an integer of at least 1, preferably 1–4, and more preferably from 1 to 2; $R^1$ is a member selected from the group consisting of ethylenically unsaturated hydrocarbyl radicals as defined above; X is a member selected from the group consisting of amino, cyano and imino moieties as defined above; M is a member selected from Group IIA, IB, IIB, IIIA, IVA, and transition metal elements; and Y is at least one of $R^2$, $R^3$, $R^4$ and $R^5$, wherein $R^2$–$R^5$ are independently selected from the group consisting of hydrogen, $C_1$–$C_{16}$ hydrocarbyl, and $C_1$–$C_{16}$ hydrocarbyloxy, which may or may not contain unsaturation, including $C_1$–$C_{16}$ alkyl, $C_6$–$C_{16}$ aryl, $C_1$–$C_{16}$ alkoxy, and $C_6$–$C_{16}$ aryloxy, which preferably are members independently selected from the group of hydrogen, methyl, ethyl, diethyl, propyl, isopropyl, butyl, tertiary butyl, pentyl, hexyl, phenyl, tolyl, ethylphenyl, naphthyl, methoxy, ethoxy, propoxy, hexoxy, pentoxy, phenoxy, methylphenoxy, iso-butoxy, and tertiary butoxy. Preferably, M is a metal element selected from the group consisting of aluminum, magnesium and zinc.

Masking Step

The reactive functionality of the NCM's (that is, the X groups discussed above) are preferably protected, i.e. "masked", prior to introducing these monomers into the polymerization reactor to form the low $T_g$ amino-substituted interpolymer (A). Otherwise, an unmasked functionality would tend to react almost immediately with the Ziegler-Natta polymerization catalyst, thereby leading to a loss of activity. The masking reaction provides a chemical deactivation of the reactivity of the functionalized monomer. This deactivation is believed to be both electronic and steric. Although not wishing to be bound by any particular theory, it is believed that deactivation may also involve the temporary replacement of highly reactive groups, such as acidic protons.

The organometallic masking agents are believed to react in one of two possible ways with the nitrogen-containing to form the masked, nitrogen-containing monomer. These pathways include the following representative, but not exclusive examples.

| NCM Functionality | M(Y)$_r$ | MNCM Functionality |
|---|---|---|
| Pathway 1 | | |
| —CH$_2$NH$_2$ | (iBu)$_3$Al | —CH$_2$NH—(Al(iBu)$_2$) |
| Pathway 2 | | |
| —C=NH<br>  |<br>  H | H Al(iBu)$_2$ | —CH$_2$—NH—(Al(iBu)$_2$) |
| Pathway 3 | | |
| —C≡N | H Al(iBu)$_2$ | 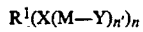 | wherein "Bu" is n-butyl, "iBu" is iso-butyl, and "Me" is methyl.

The reaction by Pathway 1 is fundamentally the replacement of an active hydrogen of the NCM functionality by a diakyl aluminum substituent. The reaction is accompanied by loss of a mole of alkane, which in this case is isobutane. The reaction of Pathways 2 and 3 is the addition of the elements of the Al—H bond of M—(Y)$_r$ across a polarized heteroatom-carbon double bond (that is, the >C=N, or >C≡N bond) of the NCM functionality. In both cases, the final MNCM functionality is for all intents and purposes the same, i.e., a masked functionality of imino, amino, or cyano. The reaction of $R^1(X)_n$ and M(Y)$_r$ by either of the pathways indicated above forms masked imino, amino, and cyano functional group-containing monomers having the general formula:

$$R^1(X(M-Y)_{n'})_n$$

wherein $R^1$, X, M, Y, n' and n are as previously defined herein. The organometallic masking agent and NCM are preferably used in the method of the present invention in a masking agent: NCM molar ratio of 0.6–2.0:1, and most preferably in a molar ratio of about 1:1, for values of n=1. Larger integral values of n imply corresponding factor increases in the NCM to masking agent molar ratios charged to the masking reaction. For example, when the NCM comprises $R^1(NH_2)_2$, the masking agent is most preferably used in a molar ratio of 2 moles of masking agent per mole of such di-functional group substituted NCM. Therefore, the masking agent and NCM are preferably contacted in an amount sufficient to provide from about 0.3 to 3, more preferably from about 0.6 to 2, and most preferably from about 0.8 to 1.5 (e.g., from about 0.95 to 1.05) moles of the masking agent per reactive nitrogen equivalent of the NCM. As used herein, the "reactive nitrogen equivalents" of the NCM refers to the moles of the NCM multiplied by the sum of (a) the number of N-bonded H atoms in amino "X" group(s) in the NCM and (b) the number of cyano "X" group(s) in the NCM. For example, if a given NCM contains two secondary amino groups (or one primary amino group) per molecule, 1 mole of such a NCM contains 2 reactive nitrogen equivalents. Similarly, if a given NCM contains two primary amino groups per molecule, 1 mole of such a NCM contains 4 reactive nitrogen equivalents.

The masking reaction, which can be performed in a batchwise, continuous or semi-continuous manner, is preferably carried out by adding the NCM to the selected metal alkyl masking agent, preferably in the presence of an inert solvent or diluent. It has been observed that the desired MNCM are not formed in acceptable yields when the reverse order of addition is used, that is, when the metal alkyl masking agent is introduced into the selected NCM; rather, such a reverse order of addition tends to form a highly viscous, sludge in the masking reactor. This sludge-like material is believed to be a result of prepolymerization of the NCM by liberation of more than one Y—H (e.g., alkane) derived from a Y group on each metal alkyl per functional group masked, due to the substantial excess of the NCM over the metal alkyl in the masking reaction zone. The masking agent and NCM should be contacted under conditions and for a time effective to form the corresponding MNCM without substantial degradation of the NCM. As used herein, the term "degradation of the NCM" is intended to include side-reactions of the NCM and any component of the masking reaction mixture, such as NCM alkylation, rearrangement and prepolymerization, which decrease the yield of MNCM obtained in contacting the selected NCM and masking agent. Preferably, the selected NCM and masking agent should be contacted at a temperature and for a time sufficient to form the MNCM in essentially quantitative yields, that is, in yields of the MNCM of at least about 95%, more preferably at least about 97%, and most preferably at least about 99%, based on the NCM fed to the masking reactor. The masking reaction should be performed in a reaction zone cooled to maintain the reactants at a temperature of less than 60° C. (e.g., less than about 50° C., generally less than about 30° C., more generally from about −70° C. to +30° C., e.g., from about −20° C. to +20° C., and most preferably from about −15° C. to +10° C. It has been found that temperatures in excess of about +60° C. results in substantial degradation of the NCM even in the presence of the masking agents. The pressure employed in the masking reactor is not critical, and any convenient pressure can be employed, e.g., from about 0.05 to 20,000 kPa. Generally, the NCM and masking agent will be contacted for the masking reaction for a time of from about 0.001 to 10 hours, preferably from about 0.2 to 3 hours.

The masking reaction should be conducted in the substantial absence of molecular oxygen and water, to avoid the deleterious effects which $O_2$ and $H_2O$ have upon the metal alkyl and the MNCM thus formed. Preferably, the masking reaction mixture (and the NCM, masking agent and solvent charged thereto) will contain <20 ppm $H_2O$, more preferably <10 ppm $H_2O$, and preferably <20 ppm $O_2$, more preferably <10 ppm $O_2$, by weight of the total reaction mixture. Most preferably, the masking reaction mixture (and hence the materials charged thereto) will contain <5 ppm $O_2$, and <5 ppm $H_2O$ (by weight of the total reaction mixture). Preferably, reactive halides will also be substantially absent in the reactor, e.g., <10 ppm by weight reactive halide (expressed as the halide, e.g., Cl), based on the weight of the total reaction mixture As used herein, the term "reactive halide" is intended to refer to free halogen (e.g., $Cl_2$), metal halides (e.g., dialkyl aluminum chloride, boron trichloride, tin tetrachloride and the like) or halogen-containing compounds (e.g., t-butyl chloride and the like) that will form metal halide under conditions of the masking reaction. Preferably the MNCM formed by the masking process of this invention are substantially free of halide, and contain less than about 0.01 wt %, more preferably less than about 10 ppm by weight, of total halide.

In the event the selected NCM was prepared by a process wherein $H_2O$ is formed as a by-product (e.g., as in the formation of 5-norbornene-2-carboxy (N-n-butyl) imine, as described above), or is otherwise present, the NCM should be treated to remove $H_2O$ to a level of <20 ppm, preferably <10 ppm, more preferably <5 ppm $H_2O$ (based on the weight of the NCM). Such water removal can be accomplished by a variety of methods, such as by cooling the NCM to a temperature sufficient (e.g. <0° C.) to freeze the water out of the liquid NCM. Alternatively, the NCM liquid can be contacted with an amount of molecular sieve (e.g. 3 Angstrom mol sieve) and for a time and under conditions sufficient to remove the desired amount of water. While the precise amount of mol. sieve will vary depending on its water absorption capacity, the amount of water to be removed and other factors, generally a contact time of from 1 min. to 1 hour at temperatures of 0° to +50° C., employing from 1 to 500 gms. of NCM per gram of 3 Angstrom molecular sieve will be sufficient to decrease the $H_2O$ level to <20 ppm for a NCM liquid containing about 10 wt % $H_2O$. The NCM feed can also be treated for water removal by the addition of water soluble inorganic salts (such as NaCl, $CaCl_2$, and the like) to form two liquid phases: the lower phase containing the salts and water; and the upper phase containing the dehydrated NCM, which can then be recovered by conventional liquid-liquid phase separation techniques.

The masking reaction may be conveniently carried out under an inert gas (such as $N_2$, Ar, He), to exclude the presence of air in the masking reaction zone.

Any solvent useful for the polymerization of the MNCM and the PCM (as discussed below) can be employed in the masking reaction For example, suitable solvents include hydrocarbon solvents such as aliphatics, cycloaliphatics, and aromatic hydrocarbon solvents, or halogenated versions of such solvents. Preferred are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Examples of such solvents are hexane, butane, pentane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane and trichloroethane.

The concentrations of the NCM and masking agent in the selected reaction solvent or diluent are not critical and will typically be selected to facilitate ease of handling of the reactants and reaction mixture and the cooling thereof to remove, and control, the heat of reaction. Typically, the NCM will be employed in a concentration of from about 2 to 70 wt %, and the masking agent in an amount of from about 1 to 40 wt %, based on the total reaction mixture.

It will generally not be necessary to remove any unreacted masking agent from the NCM-masking reaction zone, nor to remove any by-product Y-H from this reaction zone.

The product mixture produced in the masking reaction, containing the MNCM, desirably should be maintained at a temperature of less than 60° C., (e.g., less than about 50° C.), preferably less than about +30° C., preferably from about −70° C. to +30° C., and more preferably from about −20° C. to +20° C., until the MNCM is contacted for polymerization with the polymer chain monomer in the polymerization reaction zone, as will be described in more detail below.

As indicated above, the MNCM formed will have one or two —M—Y groups per functionality, and the value of n' will depend on the functionality to be masked and the masking agent employed. For example, cyano functionalities will require two —M—Y groups per cyano group when M is a trivalent, divalent or monovalent metal or element as described above. Preferably, the MNCM comprises a complex of the formula:

$$R^1(X(MY)_{n'})_n$$

wherein $R^1$, X, M, Y, n' and n are as defined above.

The masking reactions of this invention can be illustrated in the following reaction equations:

Masking Reactions for Amine Groups

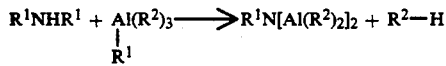

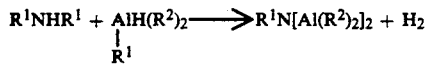

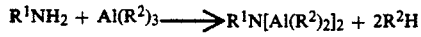

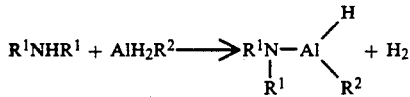

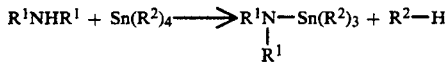

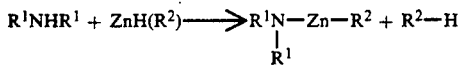

Masking Reactions for Cyano Groups

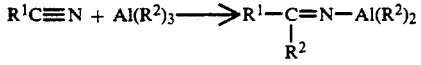

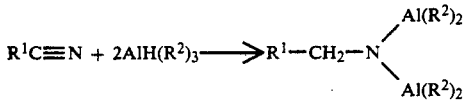

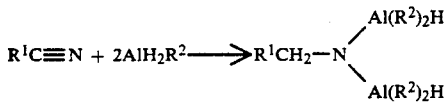

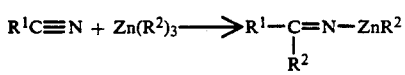

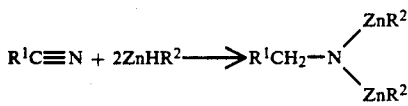

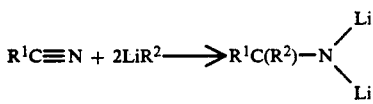

Masking Reactions for Imino Groups

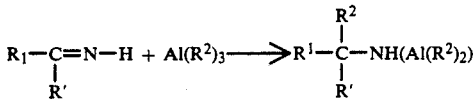

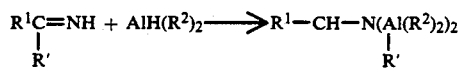

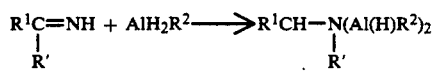

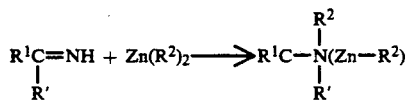

Therefore, when NCMs of the formula:

$$R^1(X^a)_n$$

wherein $R^1$ and n are as defined above, and $X^a$ is a functional group having an acidic hydrogen (e.g., —NHR', wherein R' is as defined above), are masked by masking agents of the formula:

$$(H)_{r'}M'(hydrocarb.)_{r''}$$

wherein each "hydrocarb." group can be the same or different and comprises $C_1$-$C_{16}$ hydrocarbyl (as defined above for $R^2$ to $R^5$), M' is divalent, trivalent or tetravalent M (wherein M is as defined earlier), r' is an integer of 0 to (v-1), and r'' is an integer of from 1 to v, wherein r'+r''=v, wherein "v" is a number of from 2 to 4 and is the valence of M' in said masking agent, the MNCM obtained comprises members selected from the group consisting of monomers of the formula:

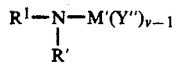     (i)

when $R^1$ is hydrocarbyl, and $$R^1N(M'(Y'')_{v-1})_2 \quad (ii)$$

wherein $R^1$, M', and v are as defined above, and wherein Y'' comprises at least one of $R^2$, $R^3$ and $R^4$, wherein $R^2$-$R^4$ are the same or different and are H or $C_1$-$C_{16}$ hydrocarbyl, with the proviso that at least one of $R^2$, $R^3$ and $R^4$ is hydrocarbyl.

Further, when the NCM comprises a monomer of the formula:

$$R^1(C\equiv N)_n$$

wherein $R^1$ and n are as defined above, and the masking agent comprises metal compounds of the formula:

$$(H)_{r'}M''(hydrocarb.)_{r''}$$

wherein M'' is divalent or trivalent M (wherein M is as defined above), "hydrocarb." is as defined above, r' is an integer from 0 to (v'-1), r'' is an integer of from 1 to v', and the sum of r'+r''=v', wherein v' is 2 or 3 and is the valence of M'' in the masking agent, the MNCM obtained comprise monomers of the general formulae:

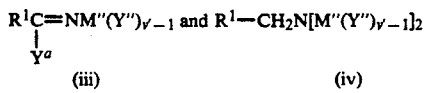

(iii)    (iv)

wherein $R^1$, $M''$ and $v'$ are as defined above, $Y^a$ is $C_1$–$C_{16}$ hydrocarby, and $Y''$ is $R^2$, $R^3$ or $R^4$, wherein $R^2$–$R^4$ are the same or different and are H or $C_1$–$C_{16}$ hydrocarbyl, with the proviso that at least one of $R^2$–$R^4$ is hydrocarbyl. Generally, MNCM of formula (iii) are obtained when r' is zero and MNCM of formula (iv) are obtained when r' is greater than zero.

When the NCM monomer comprises a cyanomonomer of the formula $R^1(C-N)_n$, and when these NCMs are masked with metal compounds of the formula:

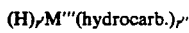

wherein $M'''$ is tetravalent M, "hydrocarb." is as defined above, and r' is an integer of from 0 to 3, r" is an integer of from 1 to 4, wherein the sum of r' and r" is 4, the MNCM can comprise monomers of the formulae:

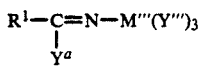    (v)

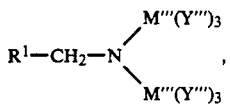    (vi)

or

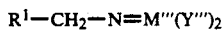    (vii)

wherein $R^1$, $Y^a$, and $M'''$ are as defined above, and $Y'''$ is $C_1$–$C_{16}$ hydrocarbyl, MNCMs of formula (v) are obtained by use of $m'''(\text{hydrocarbyl})_4$, i.e. when r' is zero. When r' is 1, the MNCM is of formula (vi). When r' is 2 or 3, the MNCM is of formula (vii).

To further illustrate the above, 5-norbornene-2-carboxy(N-n-butyl) imine can be reacted with one mole of diisobutyl aluminium hydride in hydrocarbon solvent as shown below:

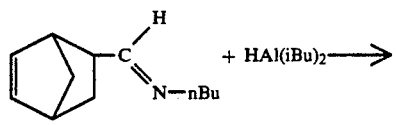

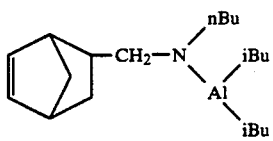

Addition of H—Al occurs across the polarized double bond of the imine leading the the masked nitrogen-containing monomer, i.e., MNCM entity.

Nitrile-substituted NCMs, e.g., 5-norbornene-2-nitrile, can be masked with two moles of masking agent, e.g. i-$Bu)_2$AlH, to generate a masked amine monomer containing two atoms of M metal (e.g., aluminum) for each nitrogen, although this is not a preferred method of masking the functionality herein. The masking of a nitrile-substituted NCM can be illustrated as follows:

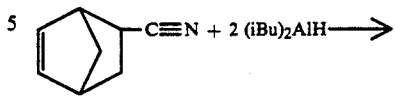

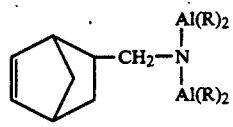

It should be noted that the mutual compatability of different masked monomers, i.e., MNCM arising from the reaction of different NCM with masking agents allow the formation and incorporation of different MNCM into the same polymer. A representative, non-exclusive, example would be to mask a mixture of 5-norbornene-2-amine and 5-norbornene-2-carboxylic acid and/or 5-norbornene-2-methanol with triisobutyl aluminum. Incorporation of this mixture in the polymerization reactor would lead to amine and carboxylic acid and/or alcohol residues on the same polymer and is a suitable procedure for incorporation of multiple functionality into the amino-substitued polymers As compared to the NCM having acidic hydrogens such as those bearing free acid, amine, or alcohol groups, the NCGM formed by these reactions has all potentially reactive functional sites either removed or complexed. Thus, the nitrogen atom in the imine NCM, which might otherwise interfere with catalyst performance by their lone pair donation, are effectively deactivated by chelation to the metal atom. The resultant MNCM is very stable in hydrocarbon solution (e.g., in hexane), both kinetically and thermodynamically, towards dissociation of the metal, in this particular case aluminum, from the NCM residue. Nevertheless, the masked amine group (and masked acid, alcohol, etc. functional group, if present) is very conveniently regenerated, as will be described in more detail below.

Preferably, the masking agent is non-halogenated since it has been observed that masked, nitrogen-containing monomers react in the presence of organoaluminum halides by polymerization of the norbornene double bond, leading to oligomeric, hydrocarbon-insoluble materials which are not available for incorporation into the polymer chain. Furthermore, this reaction may also involve rearrangement of the norbornene system leading to unreactive MNCMs which are unacceptable for incorporation into the polymer. Preferably, the masking is accomplished by reacting nitrogen-containing monomer with hydrocarbyl aluminum compounds wherein the hydrocarbyl moiety is a bulky group, that is, wherein the hydrocarbyl group is substituted (e.g., alkyl-substituted) preferably in the 1- or 2-carbon position, e.g., a branched $C_3$ to $C_5$ alkyl group such as isopropyl, isobutyl or t-butyl.

In another embodiment of the process of this invention, the MNCM prepared from an alkyl-substituted masking agent is reacted with a lower alkanol (e.g., a $C_2$–$C_5$ alcohol) and preferably a $C_3$–$C_4$ alkanol, e.g., isopropyl, isobutyl or t-butyl alcohol. The alcohols used are, in the order of increasing steric crowding around the carbinol carbon, methanol, ethanol (primary), isopropanol (secondary), and t-butanol (tertiary). The reaction of a MNCM of this invention with a lower alkanol can be illustrated by the following (wherein $R^1$ is as defined above):

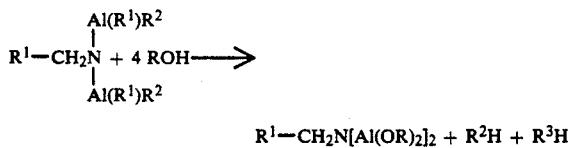

$$R^1-CH_2N[Al(OR)_2]_2 + R^2H + R^3H$$

The reaction products so formed have alkoxy radicals derived from the reactant alkanol bonded to the M metal of the MNCM. The term "alcohol modified MNCM" is used herein to refer to the adducts of MNCM and alcohol prepared in accordance with this embodiment. In an illustration of this embodiment, the nitrogen-containing monomer, NBCA, is initially complexed with triisobutyl aluminum (TIBA) and the resultant hexane soluble product is further reacted with from one to two equivalents of a dry alcohol (e.g., isopropanol). The temperature and other reaction conditions employed in such alcohol modifications of MNCM can be any of those discussed above for the initial masking reaction, and preferably a temperature of from $-30°$ C. to $0°$ C. is used, with from 1:1 to 2:1 molar equivalents of alcohol being used per masked functional group. It has been observed that such alcohol-modified MNCMs are soluble in hexane.

The resultant polymerizations with alcohol-modified NCM's demonstrate similar reactor performance than the results obtained for TIBA complexes alone. It has been found that further improvement in the degree of steric isolation of the masked NCM leading to an even lower degree of catalyst deactivation was obtained by different alcohols with the alcohol having the largest steric bulk, i.e., t-butanol, providing the most protection against poisoning with methanol providing the least, and the other alcohols being arranged between these limits in the order of their crowding around the amino group. Accordingly, the alcoholated masked, nitrogen-containing monomer has been found to result in higher polymerization efficiencies, higher polymer molecular weight and improved incorporation of nitrogen-containing monomer into the polymer.

Preparation of the low $T_g$ Amino-Substituted Interpolymer (A-1)

The polymerization process of the PCM and MNCM is performed in an otherwise conventional manner using suitable methods, including batchwise, semi-batch or continuous operations, conventional polymer chain monomers, and catalysts known to be effective for such polymerization. In this polymerization, the MNCM's behave like the non-polar homologues of these monomers. Especially preferred for use in the present invention are NCM-ethylene -propylene (EPM) terpolymers a nd NCM-ethylene-propylene-diene (EPDM) tetrapolymers. The polymerization process is preferably carried out in one or more conventional reactors, including mix-free reactor systems, continuous flow tubular reactors, and stirred-batch reactors. For purposes of illustration herein, when the process is described herein below with respect to a continuous flow stirred tank reactor, the reaction mixture is blended (i.e., back-mixed) with the incoming feed to produce a solution of essentially uniform composition everywhere in the reactor.

The monomers which are suitable as polymer chain monomers include olefin monomers such as ethylene and $C_3-C_{20}$ alpha olefins, and unsaturated, non-conjugated diolefins as described above. Illustrative of amino-substituted polymers useful in this invention are homopolymers, co-polymers, terpolymers, or tetrapolymers containing the above olefins and/or diolefins, in addition to the nitrogen-containing monomers. Exemplary of amino-substituted polymers produced by this invention are functionalized polypropylenes (propylene homopolymers, propylene-ethylene copolymers containing less than about 10 wt % ethylene, propylene-higher olefin copolymers containing up to about 10 wt % of higher alpha-olefins such as hexene-1, pentene-1, pentene-1, octene-1 and the like), functionalized polyethylenes (ethylene homopolymers and ethylene-propylene co-polymers containing greater than 90 wt %, usually 95 to 99 wt %, ethylene), ethylene-propylene copolymers (e.g., elastomeric EPM), ethylene-propylene-diene terpolymers (e.g., elastomer & EPDM) and the like. It is preferred, however, to perform the process in a copolymerization process of alpha-olefins and preferably a mixture of ethylene and propylene to result with an ethylene-propylene (EPM) polymer. The resultant polymer preferably contains about 20 wt % to 90 wt % ethylene and 10 wt % to 80 wt % propylene. It is also possible to include a non-conjugated diene, such as dicyclopentadiene, 1,4-hexadiene or ethylidene norbornene in the olefin mixture used in the polymerization process in order to introduce unsaturation into the backbone of the resultant polymer (EPDM).

The amino-substituted polymers may be formed by polymerizing polymer chain monomers with the MNCMs in the presence of a polymerization catalyst, wherein the polymerization catalyst includes at least one vanadium compound, zirconium compound or titanium compound, preferably wherein the vanadium compound has a valence of at least 3 (e.g., 3 to 5), and is preferably selected from the group consisting of vanadium halide, vanadium oxyhalide, and vanadium salts of beta-diketonates, with the vanadium halide preferably being vanadium tetrachloride and the vanadium oxyhalide compound having the general formula $VOX'_{n-}(OR^7)_{3-n'}$ where n is an integer of 2 or 3, $R^7$ is a hydrocarbyl radical which is preferably a $C_1-C_{10}$ alkyl, phenyl or benzyl and more preferably $C_1-C_4$ alkyl (such as a member of the group of methyl, ethyl, and butyl), and X' is halogen which is preferably chlorine or bromine. The vanadium salts of beta-diketonates have the general formula of $V(0\sim0)_3$ where $0\sim0$ represents the beta-diketonate anion. The preferred beta-diketonate is 2,4-pentanedionate.

The polymerization catalyst preferably also includes an organoaluminum co-catalyst comprising organoaluminum halides and organoaluminum compounds having the formula $R^6AlX''_{(3-x)}$ wherein $X''$ is a halogen, $R^6$ is a member selected from the group consisting of alkyl and aryl (and preferably wherein $R^6$ is a member selected from the group consisting of $C_1-C_{16}$ alkyl and phenyl, which is most preferably ethyl), and x is between 0 and 3, and preferably greater than 0 up to 2 (e.g. between 1 and 2), and more preferably from 1 to 1.2. Illustrative, non-limiting examples of the aluminum halide cocatalyst useful in the practice of this invention include an aluminum trichloride, ethyl aluminum dichloride, diethyl aluminum chloride and ethyl aluminum sesquichloride.

It is preferred to have the vanadium compound and the organoaluminum co-catalyst present in the polymerization catalyst in a molar ratio of vanadium to aluminum of about 1:2 to 1:30, with the molar ratio of vanadium to aluminum more preferably being about 1:5 to 1:15. The catalyst and the MNCM may be present in a molar ratio of vanadium to masked, nitrogen-containing monomers of about 1:5 to 1:100, with the molar ratio of vanadium to masked, nitrogen-containing monomers preferably being about 1:10 to 1:30. The titanium catalyst has a valence of 2 or greater and is preferably insoluble in the polymerization media. Representative, but not exclusive examples of these catalysts include $TiCl_4$, $TiCl_3$, and $TiCl_3 \cdot \frac{1}{3} AlCl_3$ (Stauffer AA Catalysts). The V and Ti catalyst can be supported on conventional catalyst supports (e.g., on silica, $MgCl_2$, zirconium, and the like). Electron donor modified versions of supported V and Ti catalytic systems can also be used.

The preferred catalysts for making elastomeric polymers include vanadium compounds, preferably having a valence of at least 3 and which are soluble in the polymerization diluent, such as $VX'_4$ and $VOX'_3$ wherein $X'$ is halogen, i.e., vanadium halide and vanadium oxyhalide. The preferred vanadium halide is vanadium tetrachloride.

The polymerization reaction zone for polymerization of the MNCM and polar chain monomers(s) can also contain one or more of the conventional polymerization promoters, such as halogenated and non-halogenated organic polymerization promoters.

In addition to the foregoing consideration, the monomers to be selected also depends on the nature of the polymerization process and the catalyst used. The reactivity of unsaturated MNCM towards polymerization, its efficiency of incorporation into the polymer, and its distribution in the polymer is a function of the catalyst system used. Thus changes in the nature of MNCM, particularly in the type of unsaturation, are needed to accommodate the changes in polymerization catalyst.

The preferred kinds of NCM hydrocarbyl radical for some of the most common kinds of olefin polymerization for purposes of the present invention are:

| Catalysis | NCM Hydrocarbyl Radical | Polymer Type |
|---|---|---|
| a. Homogeneous Ziegler Polymerization with Vanadium Catalysts | 5-Norbornene functionalized at C-2 and/or C-7. | Rubbery EP |
| b. Heterogeneous Ziegler Polymerization with Titanium Catalysts | Acyclic alpha-olefin functionalized at C-3 | Crystalline PE, PP |

The difference between the requirements for heterogeneous and homogeneous Ziegler catalysts is primarily due to the much lower reactivity of the norbornene based monomers towards the heterogeneous catalysts. For example, while the incorporation of norbornene based monomers is about 50 to 90% for the vanadium catalysts, it is usually less than about 30% for the titanium catalysts. Accordingly, the polymerization process is preferably a homogeneous Ziegler polymerization because of a higher incorporation of the monomer, and where the MNCM is a norbornene carrier, it is incorporated at about 50 to 90% with vanadium catalyst and at less than 30% with titanium catalyst. The process is, therefore, often described herein with respect to homogenous polymerization using vanadium catalyst.

The polymerization reaction can be carried out at any temperature suitable for Ziegler catalysis such as a temperature of about $-20°$ C. to about $150°$ C., or preferably about $0°$ C. to about $100°$ C. and more preferably about $15°$ C. to about $60°$ C. The pressure used in the polymerization process can vary from about 0 Kpa to about 3000 Kpa and preferably from about 20 Kpa to about 1500 Kpa; more preferably about 100 Kpa to about 1000 Kpa and 250 Kpa to 100 Kpa, most preferably about 300 Kpa to about 600 Kpa.

Preferably, the MNCM is not be premixed with any halogen-containing component of the polymerization catalyst (e.g., vanadium halide or organoaluminum halide) and left to stand for any appreciable period of time since the halide-containing catalyst components have a tendency to react with the MNCM in which case the metal-bound hydrocarbyl groups of the MNCM will be displaced by halogen. The consequence will be MNCM degradation, including polymerization/rearrangement reactions similar to those encountered when the MNCM is reacted with an organoaluminum halide masking agent as described above. It has been observed that the polymerization results with a greater efficiency of incorporation of the MNCM to yield a higher molecular weight polymer, and with decreased incorporation of halogen into the resultant polymer.

Preferably, the MNCM is added to the polymerization reaction zone separately from the polymerization catalyst components, so as to first contact the polymerization catalyst in the presence of the polymer chain monomer(s), preferably under polymerization conditions.

Any known diluent or solvent for the reaction mixture that is effective for the purpose can be used in conducting polymerization of the PCM and the MNCM to form the masked functionalized (amino-substituted) polymer. For example, suitable diluents or solvents would be hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Most preferred are $C_{12}$ or lower straight-chain or branched-chain hydrocarbons particularly hexane. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The polymerizations can be carried out in the presence of a molecular weight regulator to produce a low $T_g$ amino-substitued polymer having any particular desired molecular weight. A molecular weight regulator commonly used in this type of process is, for example, hydrogen. The amount of molecular weight regulator to be used can easily be chosen based on principles well-known to those skilled in the art, depending upon the desired molecular weight of the low $T_g$ amino-substitued polymer.

Hydrogen can be introduced to the polymerization zone to moderate polymer molecular weight. The hydrogen will be generally added in an amount of from about 0 to about 30 mole percent, based on the total monomer (MNCM +PCM).

After polymerization, the polymerization is quenched at the exit of the reactor. This quenching can be accomplished by the introduction into the polymerization reaction mixture (e.g., in the reactor or into polymerization product effluent stream) of water, lower alkanol, or aqueous acid (e.g., aqueous HCl) as quench liquid, generally using from 1 to 30 moles of quench liquid per mole of total V and Al in the reaction mixture.

The desired amino functional group, i.e., X, incorporated into the low $T_g$ amino-substituted interpolymer as the masked functional group, can be regenerated by removal of the masking metal, M, through use of conventional de-ashing techniques, wherein the quenched polymerization product, containing masked-functionalized polymer, the polymerization catalysts, and unreacted monomers, is contacted with an aqueous liquid, e.g., water, aqueous solutions containing mineral acids (e.g., HCl, HBr, HNO$_3$, H$_2$SO$_4$, H$_3$PO$_4$, and the like), aqueous solutions containing mineral bases (e.g., caustic ammonia, sodium methoxide and the like) or mixtures thereof. The resulting hydrolysis reactions (hereinafter referred to as "de-ashing") liberate the metal masking agent and generates the amino functional group, thereby forming a low $T_g$ amino-substituted polymer. Such hydrolysis reactions can be illustrated as follows:

aqueous soluble salts of the catalyst and masking agent metal(s). The aqueous layer will preferably also contain unreacted NCM, due to the water solubility of the NCM attributed by the hydrophilic nature of the "X" functionality.

The polymer may be recovered from the upper phase by flash evaporation followed by drying to remove residual water. The flashing technique can involve the addition of the quenched polymerization product to a tank of hot water (50° C. to 100° C.) sprayed with steam to strip off the solvent and unreacted monomers. The polymer may be then dried by evaporation of water, generally at temperatures of from about 150° C. to 200° C., e.g., on a hot rubber mill.

It will be understood that any cyano groups of the NCM will, upon masking, polymerization and regeneration, be regenerated as an amino group, rather than a cyano. The amino group may be either primary or secondary, and is determined by the number of carbon radicals attached to the nitrogen in the masked monomer. A single carbon radical leads to primary amine while two alkyl groups lead to a secondary amine.

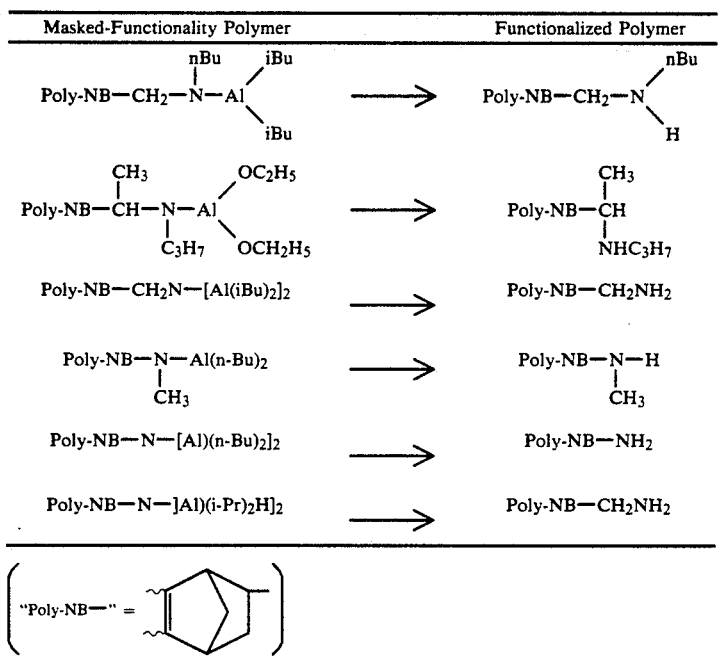

De-ashing to regenerate the amino group can be conveniently accomplished by contacting the quenched polymerization product with from 0.3 to 3 volumes of water per volume of polymerization reactor effluent (in equivalent units); the water may optionally contain from 1 to 30 wt % (e.g. 3 to 10 wt %) of mineral acid(s). The mixture is contacted for a time and under conditions sufficient to de-ash the polymer and to regenerate the amino group. Generally, the contacting will be conducted for a time of from about 3 to 30 minutes, and a temperature of from about 0° C. to 85° C., with vigorous stirring. The use of an acidic aqueous liquid may be followed by one or more water washes of the separated polymer to remove residual amounts of the mineral acid. The 2-phase liquids resulting in the above steps will permit recovery of a polymer-containing upper liquid phase comprising the functionalized polymer and polymerization solvent or diluent, and an aqueous lower liquid phase containing the mineral acid, and The NCM is present in the resultant amino functionalized polymer in an amount of from about 0.01 to about 40 wt %, by total weight of the amino functionalized polymer preferably in an amount of from about 0.1 to about 20 wt %, more preferably in an amount of from about 0.75 to about 10 wt %, and most preferably in an amount of from about 1.0 to about 7 wt %. The preferred low $T_g$ amino-substituted ethylene-propylene copolymers employed in this invention will, therefore, comprise from about 20 to 90 wt % ethylene, from about 10–80 wt % propylene, and from about 0.01 to 40 wt % nitrogen-containing monomer, more preferably from about 0.1 to 20 wt %, still more preferably from about 0.75 to 10 wt %, and most preferably from about 1 to 7 wt %, nitrogen-containing monomer. The preferred low $T_g$ amino-substituted ethylene-propylene-diene terpolymers employed in this invention will therefore comprise from about 20–90 wt % ethylene, from about 10–80 wt % propylene, from about 0.5 to 15 wt % (and more preferably from about 1 to 10 wt %) non-conjugated diene, and from about 0.01 to 40 wt %, more preferably from about 0.1 to 20 wt %, still more preferably from about 0.75 to 10 wt %, and most preferably from about 1 to 7 wt %, nitrogen-containing monomer.

The low $T_g$ amino-substituted polymers employed in this invention are preferably oil soluble and have a number average molecular weight ($\overline{M}_n$) of from about 500 to 500,000, preferably from about 1,000 to 200,000, and more preferably from about 10,000 to 150,000. For electronic applications, the of $\overline{M}_n$ the low $T_g$ amino-substituted polymer will preferably be from 500 to 200,000, and more preferably from 700 to 150,000.

Preferably, the low $T_g$ amino-substituted polymers have a substantially homogeneous distribution of amino functionality between the polymer chains, that is, the wt. % concentration of amino functionality is substantially uniform for chains of all molecular weights. Furthermore, the polymers preferably cannot be separated into two or more significant fractions (e.g., >5 wt % of total polymer) which have different compositions arising from different levels of incorporation of NCM and PCM. The "level of functionality" as used herein is defined to be equivalents of amino functionality per unit weight of the low $T_g$ amino-substituted polymer, and is commonly expressed for these polymers in milliequivalents of functionality per 100 gms of amino-substituted polymer.

The distribution of functionality in a polymer can be readily determined by methods known in the art. One technique is to tag a random fraction of the functionality with a UV-visible chromophore. The tagging is done by a specific chemical reaction (e.g., amidation) on the functionality of choice with a reagent carrying the UV-visible chromophore tag. The tagging reaction is chosen to be one where the tagged functionality will exist in that state through the subsequent investigations. The chromophore found to be particularly suitable for this purpose is the phenyl ring and procedures for derivatizing amino functionalities with suitable phenyl group containing agents are well known in the art. The derivatized polymer is analyzed by a gel permeation chromotographic procedure and the effluent is analyzed by two detectors, i.e., one for the quantity of the polymer and the other sensitive to the concentration of the chromophore. The uniformity of functionality distribution in the original polymer is observed by coincident responses of the two above mentioned detectors.

Also, the low $T_g$ amino-substituted polymers have a low total halogen content and are essentially devoid of any organic halide. Preferably, the low $T_g$ amino-substituted polymers contain less than 0.10 wt %, and preferably less than 0.03 wt %, of total organic chlorine, with an organic chloride content measured by the absorbance of 1/100 inch thick film of the polymer at 610 cm$^{-1}$ of less than 0.05, and preferably 0.03, absorbance units.

Analytic Methodology Used in Examples 1–5

The low $T_g$ amino-substituted polymers prepared in the following Examples have $T_g$ of less than −40° C. (ASTM Method D-3418).

The polymerization rate was determined by weighing the amount of rubber obtained in a fixed time period. Monomer conversion and catalyst efficiency (weight of polymer products/wt. vanadium catalyst feed) were determined to characterize the catalyst activity. Infrared analysis (ASTM D3900) was used to measure polymer ethylene content while refractive index [I. J. Gardiner & G. Ver Strate, *Rubber Chem. Tech.*, 46, 1019 (1973)] was used for ENB content. In the absence of ENB in the polymer, this was also used as a semi-quantitative measure of NCM content in the polymer. Polymer Mooney viscosity was measured by ASTM D-1646.

Molecular weight (number-average, $\overline{M}_n$; weight-average, $\overline{M}_w$; z-average, $\overline{M}_z$) and molecular weight distribution (MWD = $\overline{M}_w/\overline{M}_n$) were measured using a Waters 150 gel permeation chromatograph equipped with a Chromatix KMX-6 on-line light scattering photometer. The system is used at 135° C. with 1,2,4-trichlorobenzene as the mobile phase. Showadex (Showa-Denko America, Inc.) polystyrene gel columns 802, 803, 804 and 805 were used. The technique utilized is described in *Liquid Chromatography of Polymers and Related Materials III*, J. Cazes, editor, Marcel Dekker, 1981, p. 257 et seq., incorporated herein by reference. No corrections for column spreading are employed; however, data on generally accepted standards, e.g., National Bureau of Standards Polyethylene 1484 and anionically produced hydrogenated polyisoprene demonstrate that such corrections on $\overline{M}_w/\overline{M}_n$ or $\overline{M}_z/\overline{M}_w$ are less than 0.10 units. $\overline{M}_w/\overline{M}_n$ was calculated from an elution time-molecular weight relationship, whereas $\overline{M}_z/\overline{M}_w$ is evaluated using a light scattering photometer. The $\overline{M}_w/\overline{M}_n$ are used as an indication of MWD breadth (the larger the value, the broader MWD). Polymers were analyzed for amino functionality content by infra red spectroscopy. Polymers containing amino functionality were dissolved in hexane (approx. 3 wt. % solution) and quantitatively amidated with an equal volume of acetic anhydride, according to the reaction below:

Poly-CH$_2$NH$_2$ + (CH$_3$.CO)$_2$O → Poly-CH$_2$.NHCOCH$_3$ + CH$_3$CO$_2$H

After refluxing for two hours, the polymer was recovered, molded in a pad of uniform thickness between 0.003 to 0.02 inch thick. The infrared spectrum of the sample contained an intense absorption at 1660 cm$^{-1}$ due to the carbonyl group. The intensity of this absorption was measured in absorbance units ($A_3$). This was correlated to the concentration of milliequivalents amino functionality expressed in milliequivalents per 100 gm of polymer ($C_{alcohol}$) by the following relationship:

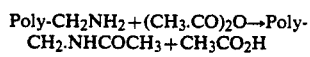

$C_{amine} = A_3/t_3 \times 72.9$ where $t_3$ is the thickness of the polymer sample expressed in thousandth of an inch.

These analytical relations were obtained by measuring the infrared extinction coefficients for the carbonyl groups and closely related monomeric model compounds in hexane media. Typically the experiment was conducted with the derived NCM and repeated to cover the span of obtainable concentrations of amino functionality. In all cases, Beer's law was found to be obeyed by the chromophore between the concentration of 0–30 meq/100 gms of amino-substituted polymer.

Polymers were analyzed for the distribution of amino functionality among the polymer chains (i.e., intermolecular amino functionality concentration distribution). The distribution of amino functionality in the polymers for purposes of tests run and comparisons made in connection with this application is measured by a chromatographic technique.

Uniformity (or "homogeneity") of amino functionality distribution is measured by observing the variation in the extinction coefficient, that is the ratio of the concentration of the chromophore to the total weight of the polymer as a function of amino functionalized polymer chain molecular weight. A polymer with a substantially uniform amino functionality distribution has this ratio substantially constant over a wide range of polymer chain molecular weights. Amino-substituted polymers employed in the present invention preferably have the above-mentioned ratio varying by from about 0 to 15%, and more preferably from about 0 to 10%, in the chain molecular weight range of $10^3$ to $10^9$, provided the molecular weight range is such that the polymer components contain at least 95%, and preferably 97%, of the total weight of polymer, and that at least 95%, and preferably 97%, of the total equivalents of the amino functionality are included.

Uniformity of composition was also determined by a solvent fractionation technique. In this procedure, a polymer hexane solution containing approximately 1-2 grams of amino-substituted polymer per 100 ml. of solvent was treated judiciously with isopropanol to precipitate a fraction of the amino-substituted polymer. The precipitated amino-substituted polymer was equilibrated for 30 minutes with the bulk of the solution and then removed by filtration. More fractions were obtained by further addition of aliquots of isopropanol to the filtrate until the amino-substituted polymer was almost completely precipitated. The last fraction was obtained by evaporating the filtrate to a solid residue. Typically, the amino-substituted polymer was divided into 8 or 10 fractions and these were analyzed for ethylene residue content by infrared spectroscopy and for norbornene residue content by changes in refractive index. As indicated by the test results, amino-substituted polymers employed in the present invention preferably have substantially uniform compositions of NCM, within the chain molecular weight range of $10^3$ to $10^9$, which amount to within 15% and more preferably within 10% of the average for the whole amino-substituted polymer. The analysis of the norbornene residue content indicated that no fraction of the amino-substituted polymer analyzed contained more than 7% and preferably 5%, of the total weight of the polymer, and that no fraction of the polymer analyzed contained 35% or more of the total amount of amino functionality in the polymer.

The low $T_g$ amino-substituted polymers were also analyzed for halogen content. For purposes of this application, the halogen content of the polymer was determined only for chlorine residues which appear to be the largest fraction of halogen contaminates. Nevertheless, the analysis can be generalized to other applicable halogens, i.e., bromine. Chlorine was determined by elemental analysis according to instrumental techniques established in the art and organic chloride content in the polymer was determined by the intensity of the absorbance of a polymer film of standardized thickness at 610 cm$^{-1}$ in the infrared spectrum where C—Cl bonds absorbs strongly.

The following examples are presented below to illustrate the foregoing discussion for a better understanding of the invention. All parts, proportions and percentages are by weight unless otherwise indicated. Although the examples may be directed to certain embodiments of the present invention, they are not to be viewed as limiting the invention in any specific respect. In the following examples, the following abbreviations have these meanings:

EADC = ethyl aluminium dichloride
EASC = ethyl aluminium sesqui chloride
DIBAL-H = di isobutyl aluminium-hydride
NBCXA = 5-norbornene-2-carboxaldehyde
PhNH$_2$ = aniline
BuNH$_2$ = n-butyl amine

EXAMPLE 1

In separate runs, 2.5 mmol of NBCXA dissolved in 10 ml of hexane was slowly added, with stirring, to a cold solution of 2.5 mmol of either n-butyl amine, or aniline in hexane. The addition was performed under a nitrogen atmosphere and the reaction temperature was maintained at 0° C. by external cooling. The reaction mixture was stirred for 30 minutes and to the resultant cloudy mixture was added 20 gms of 4 Angstrom dry molecular sieve. After 30 minutes of contact with agitation the clear solution of n-butyl imine or phenyl imine, respectively, of NBCXA was decanted off into a dry nitrogen filled flask. To this solution was added 2.6 ml of a 15% solution of DIBAL-H in hexane under nitrogen over a period of 30 seconds. The solution temperature was allowed to warm to ambient temperature (25° C.) and after 30 minutes a pale yellow solution of the masked amine monomer was obtained.

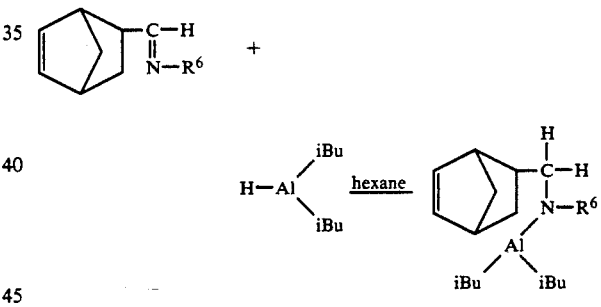

wherein R$^6$ = nBu or Ph

The course of the reaction was identified by C—13 NMR the solutions. Solutions of the reaction with metal alkyls suitable for NMR analysis were prepared, and C—13 NMR of the solutions was observed as described earlier. The NMR results are shown in the Table below.

TABLE I

C-13 NMR Data for 5-Norbornene-2-Carboximine Complex with Diisobutylaluminum hydride
(Data for Principle Endo Isomer Only)

| Compound | Carbox Carbon | Olefinic Carbon | |
|---|---|---|---|
| | | C-5 | C-6 |
| 5-Norbornene-2-Carboxaldehyde (1) | 198 (d,170) | 136.3 (d,173) | 131 (d,171) |
| 1 + BuNH$_2$ (1:1) (2) | 164.4 (d,150) | 135.9 (d,168) | 131.5 (d,170) |
| 1 + PhNH$_2$ (1:1) (3) | 166.5 (d,153) | 136.1 (d,170) | 131 (d,165) |
| 2 + (i-Bu)$_2$AlH (1:1) | 72 (t,30) | 136 (d,165) | 132 (d,170) |

TABLE I-continued

C-13 NMR Data for 5-Norbornene-2-Carboximine Complex with Diisobutylaluminum hydride (Data for Principle Endo Isomer Only)

| Compound | Carbox Carbon | Olefinic Carbon | |
|---|---|---|---|
| | | C-5 | C-6 |
| 3 + (i-Bu)$_2$AlH (1:1) | 69.2 (t,132) | | |

All spectra in hexane solution only
Data in ppm from TMS; numbers in parenthesis are coupling $^{13}$C—$^1$HC (d = doublet; t = triplet)

These experiments indicate that the reduction of 5-norbornene-2-carboxyimine (Products 2 or 3) with diisobutyl aluminum hydride leads to the formation of a single masked amine monomer.

EXAMPLE 2

79.0 g of 5-norbornene-2-carboxaldehyde (NBCXA), (77.6 ml, 0.647 mole) were dissolved in 500 ml of hexane. 47.3 g of n-butylamine (64 ml, 0.647 mole) was slowly added at 25° C. The solution was stirred for five minutes and cooled to −18° C. for several hours. The liquid hexane layer was decanted under nitrogen to remove the precipitated water which had frozen to ice and adhered to the sides of the reaction vessel. The clean hexane solution was removed under nitrogen to a separate reactor and dried with 50 gms of dried 4A molecular sieve. After thirty minutes, the hexane layer containing the n-butyl imine of NBCXA was separated from the molecular sieves and to it was added at −10° C. 80.3 gm (0.647 mole) of diisobutylaluminum hydride as a 15% solution in hexane under nitrogen. The solution was stirred under nitrogen for one hour to yield the MNCM of 5-norbornene-2-methyl-(N-n-butyl) amine. The reactions are summarized below:

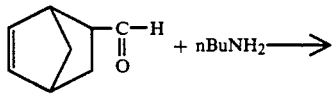

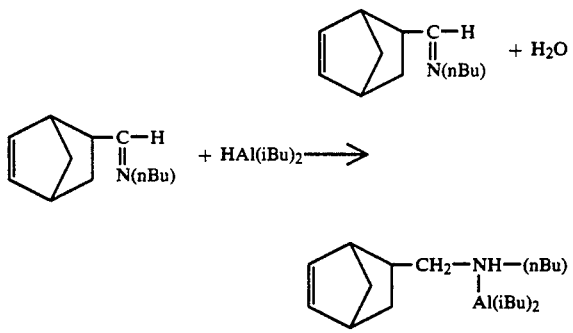

EXAMPLE 3

In this example, the MNCM obtained by reacting 5-norbornene-2-carbox-(N-n-butyl) imine with diisobutyl aluminum hydride in an equimolar ratio was introduced into an EP polymerization reactor. The object was to determine if this MNCM was acceptable for introducing secondary amine functionality in EP. The MNCM was made according to the procedures described below.

77.6 ml of 5-norbornene-2-carboxaldehyde (NBCXA) (79.0 gm) was slowly added to a solution of 64 ml of n-butylamine (47.4 gms) in 500 ml of hexane solution. The mixture was allowed to stand for 3 hours at 0° F. and separated from the precipitated water. The clear hexane solution was dried by standing over 4A° mole sieves for 2 hours and slowly added to a solution of 80.2 gm of diisobutyl aluminum hydride in 1000 ml of hexane at −30° C. under a nitrogen blanket. After 3 hours at room temperature, the resultant solution was ready for introduction into the polymerization reactor. The conditions of polymerization are shown in Table II and the results in Table III:

TABLE II

| Conditions | |
|---|---|
| Reactor = | 3.875 liter (CFSTR) |
| Temperature = | 27° C. |
| Pressure = | 500 Kpa gauge |
| Agitation = | 1200 rpm |
| Residence = | 9 min. |
| Al/V Molar Ratio = | 10 for catalysts compounds |
| Feeds | |
| Hexane = | 23.9 liters/hr. |
| Ethylene = | 363 g/hr. |
| Propylene = | 643 g/hr. |
| VCl$_4$ = | 1.896 g/hr. |
| EASC = | 1.22 g/hr. |
| EADC = | 12.48 g/hr. |
| Hydrogen = | 120 w ppm on ethylene |
| NCM (masked = as above) | 23.40 g/hr. |

TABLE III

| Polymerization Parameters | | Polymer Proportion | | |
|---|---|---|---|---|
| Rate (g/hr) | Catalyst Efficiency (g/g) | Ethylene Content (wt %) | $M_L$ (1 + 8) (100° C.) | MNCM (conv %) |
| 766 | 405 | 45.8 | 18 | 93 |

The results of this example show that the MNCM generated by the addition of diisobutyl aluminum hydride to imines is an acceptable method for incorporating amine functionality in EP.

EXAMPLE 4

In this example, low $T_g$ amino-substituted EP polymer obtained by the procedures described in Example 3 was analyzed for distribution of functionality along the polymer chains. The object was to demonstrate that the formation of MNCM by reaction with nonhalogenated aluminum alkyls lead to a substantially uniform distribution of functionality in the polymer chain. The polymer was analyzed by (i) the gel permeation chromatography method and (ii) the solvent-nonsolvent fractionation method according to the procedures outlined earlier and described in detail below.

10.2 gms of the polymer made in Example 3, with diisobutyl aluminum hydride as the masking agent, was dissolved in 500 ml of hexane. To the clear solution was added with magnetic stirring isopropanol from a burette. After addition of approximately 35 ml of isopropanol a slight white precipitate was obtained. The rate of addition of isopropanol was slowed to ∼1 drop/minute and agitation continued until a sizeable amount of polymer was precipitated. The precipitated polymer was equilibrated with the remaining solution by slow agitation at room temperature for 30 minutes The slurry was filtered through a weighed filter paper and the residue dried to obtain the first fraction. To the filtrate was added a further amount of isopropanol (approx. 7 ml) to precipitate the second fraction which was removed in an identical manner. Continuing this process eight fractions of approximately equal weight were obtained with the last fraction being obtained by evaporation of the filtrate of the seventh precipitation. The fractions were labelled in their order of precipitation and each aliquot was recovered, dried and analyzed according to the techniques described above by a combination of infrared spectroscopy and refractive index.

TABLE IV

| Fraction | wt (gms) | NCM Content (wt %)[1] |
|---|---|---|
| 1 | 1.2 | 1.3 |
| 2 | 1.0 | 1.4 |
| 3 | 1.4 | 1.5 |
| 4 | 1.0 | 1.4 |
| 5 | 1.3 | 1.5 |
| 6 | 1.1 | 1.3 |
| 7 | 1.7 | 1.5 |
| 8 | 1.5 | 1.3 |

Note
[1]NCM content determined by refractive index, which is proportional to the actual weight percent.

The analysis of the low $T_g$ amino-substituted polymer shows that the polymer has a substantially uniform distribution of amino functionality among the polymer chains.

EXAMPLE 5

In this example, the low $T_g$ amino-substituted EP polymer made by the procedures set forth in Example 3 was analyzed for chlorine. Chlorine content was determined by two procedures, i.e., (i) a total chlorine content by elemental analysis, and (ii) a measure of organic chlorine by infrared spectroscopy.

5.1 gms of the polymer was dissolved in 200 ml of hexane. The solution was filtered to remove all suspended impurities. Sufficient isopropanol to precipitate all the polymer was then slowly added with stirring to the clear filtrate. The precipitated polymer was recovered by filtration, dried and analyzed by chlorine content. The amino-substituted polymer was found to contain 101 ppm $Cl$ by elemental analysis, and to provide 0.03 absorbance at 610 cm$^{-1}$ by infrared spectroscopy (absorbance measured for a film of uniform thickness of 2/100 inch with similar film of nonfunctionalized EP as reference).

A-2 As indicated above, the low $T_g$ amino-substituted polymer can comprise a polyolefin substituted by at least 1 primary or secondary amino group prepared by halogenation of a polyolefin to form a polymer substituted by halogen groups, followed by reaction of this halogenated polymer with an amine. Such processes are conventional (and are disclosed, e.g, in U.S. Pat. Nos. 3,275,554, 3,438,757, 3,565,804, and 4,000,353, the disclosures of which are hereby incorporated by reference in their entirety) where the halogen group on the halogenated polymer is displaced with the nitrogen- containing compound in the subsequent reaction therewith.

For example, a polymer of a $C_2$ to $C_5$ monoolefin, e.g., polyethylene, polypropylene or polyisobutylene, (e.g., having a $\overline{M}_n$ of greater than 10,000, such as 15,000 to 500,000 or more, generally from 20,000 to 250,000) can be halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular polymer used, the desired amount of amine to be introduced into the molecule, the particular alkylene amine used, and the halogen used. The amount of halogen introduced will generally be in the range from about 1 to 5 halogen atoms per molecule, depending on the reactivity of the resulting halide. On a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period.

The halogenated polymer and amine compound containing at least one —$NH_2$ group per molecule (e.g., ammonia, alkylene polyamine or polyalkylene polyamine) may be brought together in the presence or in the absence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. Depending on the temperature of the reaction, the particular halogen used, the mole ratios and the particular amine, as well as the reactant concentrations, the time may vary from 1 to 24 hours, more usually from about 3 to 20 hours. Times greatly in excess of 24 hours do not particularly enhance the yield and may lead to undesirable degradation. It is therefore preferred to limit the reaction time to fewer than 24 hours.

The mole ratio of halogenated polymer to amine compound will generally be in the range from about 0.2 to 10 moles of amine compound per mole of halogenated polymer, more usually 0.5 to 5 moles of amine compound per mole of halogenated polymer. The mole ratio will depend upon the amount of halogen present in the halogenated polymer, the particular halogen and the desired ratio of halogenated polymer to amine compound.

After the reaction has been carried out for a sufficient length of time, the reaction mixture may be extracted with a hydrocarbon medium to free the product from any low molecular weight amine salt which has formed. The product may then be isolated by evaporation of the solvent. Further separation from unreacted hydrocarbon or purification may be carried out as desired, e.g., chromatography.

II. Aromatic Nitrogen-Containing Monomer

The aromatic nitrogen-containing monomers (also referred to herein as "aromatic N-monomers") employed in the present invention contain one or more aromatic ring, wherein at least one aromatic ring is substituted by a —$NH(R^a)$ group, wherein $R^a$ is hydrogen or hydrocarbyl (e.g., $C_1$ to $C_{25}$ hydrocarbyl, and preferably H or $C_1$ to $C_3$ alkyl). Such aromatic N-monomers include compounds of the formula:

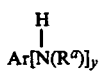

wherein Ar is a substituted or unsubstituted aromatic radical, $R^a$ is as defined above and y is an integer of at least 1 (e.g., 1 to 4, preferably 1-2).

The Ar radical will generally contain from 6 to 20 ring carbon atoms and can comprise a single aromatic ring, fused aromatic rings, or linked aromatic rings, and can be substituted or unsubstituted. Preferably, the substituents on the Ar radical substituents are positioned ortho- and/or meta- to the N substituent. The Ar radical's substituents can be the same or different and can comprise $-Z^2$ or $-Z^1Z^2$ wherein $Z^1$ is a member selected from the group consisting of (a) a branched or straight chain alkylene group (e.g., $-C_nH_{2n}-$, wherein n is an integer of from 1 to 20, preferably from 1 to 6) which can contain one or more $-O-$ or $-S-$ chain atoms (e.g., $-(C_{n'}H_{2n'}X)_{n''}-$ wherein n' is an integer of from 1 to 6, preferably from 1 to 4, and n" is an integer of from 1 to 20, preferably from 1 to 6 and X is O or S), and (b) groups of the formula:

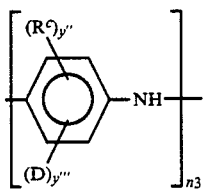

wherein $n_3$ is from 1 to 4 (and preferably 1 to 2), $R^c$ in each instance in which it appears is independently $C_1$ to $C_{12}$ alkyl (preferably $C_1$ to $C_4$ alkyl), D in each instance in which it appears is independently Cl, Br or I, y" is an integer of from 0 to 4 (preferably from 0 to 3), y'" is an integer of from 0 to 4 (preferably from 0 to 3), and wherein $R^b$ is H or $C_1$ to $C_{20}$ alkyl and y' is an integer of from 1 to 4 (preferably 1 or 2), with the proviso that the sum of y'+y"+y'" is from 1 to 5 (preferably from 1 to 4, more preferably from 1 to 3), and wherein $Z^2$ is a member selected from the group consisting of H, $-OH$, $-$halide, $-R^c$, $-SO_3H$, $-PO_3H$, $-SO_3R^c$, $-PO_3R^c$, $-CO_2R^c$, $-CO_2H$, or $-NO_2$, wherein $R^c$ is hydrocarbyl (e.g., $C_1$ to $C_{12}$ hydrocarbyl). The Ar group, if substituted, will preferably be substituted by 1 to 3, more preferably 1 to 2, $C_1$ to $C_{20}$ hydrocarbyl (e.g., alkyl) groups, or with 1 to 3 halogen radicals (e.g., Cl—, Br—, or I—). Examples of suitable unsubstituted Ar groups are phenyl, naphthyl, bi-phenyl, terphenyl, quarterphenyl, quinquiphenyl, sexiphenyl, naphthylphenyl, phenylnaphthyl and the like. Examples of fused aromatic ring Ar systems are anthracene, phenanthrene, tetracene, acenaphthene and phenalene. Preferred polyaromatics are the polyphenylenes.

To avoid competing side reactions $R^a$ and $R^c$ are preferably substantially free of polymerizable ethylenically unsaturated double bonds.

Preferred aromatic N-monomers for use in the present invention comprise compounds of the formula:

wherein Ar' is

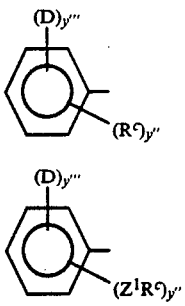

wherein $Z^1$ is as defined above, $R^c$ in each instance in which it appears is independently $C_1$ to $C_{12}$ alkyl (preferably $C_1$ to $C_4$ alkyl), D in each instance in which it appears is independently Cl, Br or I, y" is an integer of from 0 to 4 (preferably from 0 to 3), y'" is an integer of from 0 to 4 (preferably from 0 to 3), and wherein $R^b$ is H or $C_1$ to $C_{20}$ alkyl and y' is an integer of from 1 to 4 (preferably 1 or 2), with the proviso that the sum of y'+y"+y'" is from 1 to 5 (preferably from 1 to 4, more preferably from 1 to 3).

Illustrative of aromatic N-monomers useful in this invention are aniline, N-methyl aniline, N-ethyl aniline, N-propyl aniline, N-isopropyl aniline, N-(tert-butyl) aniline, 2-aminophenol, 3-aminophenol, 2-amino-4-chloro-6-nitrophenol, 2-amino-4,6-dichlorophenol, 2-amino-4,6-dinitrophenol, 2-amino-4-chlorophenol, 2-amino-4-nitrophenol, 2-amino-1-phenol-4-sulfonamide; 3-amino-2-hydroxybenzoic acid, 2-amino-6-nitro-4-methylphenol, 6-amino-4-nitro-2-methylphenol, 2-amino-3-nitro-4-methylphenol, 2-amino-4-methylphenol, 2-amino-4-(methylsulfonyl)phenol, 3'-amino-2'-hydroxy-5'-nitroacetanilide, 3'-amino-4'-hydroxy-5'-nitroacetanilide, diphenyl amine, 0-toluidine, m-toluidine, 2,3-xylidine, 2,5-xylidine, 2,6-xylidine, 3,5-xylidine, o-anisidine, m-anisidine, o-phenetidine, p-cresidine, acetanilide, acetoacetanilide, o-chloroaniline, m-chloroaniline, 2,5-dichloroaniline, 2-amino benzene sulfonic acid, 3-amino benzene sulfonic acid, o-nitroaniline, m-nitroaniline, naphthalene amines, such as: 1-(naphthylene)amine, 2-(naphthylene)amine, and the like, N-phenyl-2-napthalene amine, amino-1-naphthalene carboxylic acid, N-(monosubstituted) aminophenols, such as 3-anilinophenol, 3-ethylamino-4-methylphenol, 3-hydroxy-N-phenylaniline, 3-hydroxy-2'-methyldiphenylamine, 3-ethylaminophenol, 3-methylamino-4-methylphenol, 3-ethylamino-4-methylphenol, 4-anilinophenol, 4-acetaminophenol, 2-amino-3,6-dichloro-1-phenol-4-sulfonic acid, 2-amino-6-chloro-1-phenol-4-sulfonic acid, 3-amino-1-phenol-4-sulfonic acid, 2-amino-1-phenol-4-sulfonic acid, 5-amino-6-hydroxy-3-methylbenzenesulfonic acid, 4-acetamido-6-amino-1-phenol-2-sulfonic acid, 5-amino-1-naphthalenesulfonic acid, 5-amino-2-naphthalenesulfonic acid, 8-amino-2-naphthalenesulfonic acid, 8-amino-1-naphthalenesulfonic acid, 2-amino-1-naphthalenesulfonic acid, 6-amino-1-naphthalenesulfonic acid, 7-amino-2-naphthalenesulfonic acid, 7-amino-1-naphthalenesulfonic acid, 1-amino-2,7-naphthalenedisulfonic acid, 4-amino-2,7-naphthalenedisulfonic acid, 4-amino-2,6-naphthalenedisulfonic acid, 8-amino-1,6-naphthalenedisulfonic acid, 5-amino-1,3-naphthalenedisulfonic acid, 3-amino-1,5-naphthalenedisulfonic acid, 5-amino-1-naphthalenol, 7-amino-2-naphthalenol, 4-hydroxy-8-amino-2-naphthalenesulfonic acid, 4- hydroxy-7-amino-2-naphthalenesulfonic acid, 4-amino-5-hydroxy-2,7-naphthalenedisulfonic acid, aniline HCl, aniline sulfate, and the like.

Preferred aromatic N-monomers are o-methylaniline, o-ethylaniline, o-methoxyaniline, o-phenylaniline, o-aminoaniline, o-fluroaniline, o-chloroaniline, o-nitroaniline, o-methylaniline, m-ethylaniline, m-methoxyaniline, m-chloroaniline, m-nitroaniline, p-phenylaniline, N-methylaniline, N-ethylaniline, N-benzylaniline, N-methylaniline, N-phenylaniline, and N-naphthylaniline, and mixtures thereof.

Most preferred aromatic N-monomers on the present invention are aniline, o-toluidine, m-toluidine, m-ethylaniline, and o-ethylaniline.

Grafting of Aromatic N-Monomer (B)

The amino-substituted polymer (A) is grafted with the aromatic N-monomer (B) in accordance with this invention by contacting the aromatic N-monomer and low $T_g$ amino-substituted polymer under polymerizing conditions in a polymerization zone in the presence of an effective amount of an oxidizing agent.

Oxidizing agents which can be employed have a reducing single electron potential ($E°_{red}$) greater than 1.00 volt, preferably grater than 1.5 volts and more preferably greater than 1.7 volts (e.g., from 1.5 to 2.5). $E°_{red}$ values for standard half reactions are obtained from *Lange's Handbook of Chemistry*, 13th ed., page 6-2 to 6-5, (J. A. Dean, Ed., McGraw Hill Book Company (1985), which is incorporated herein by reference.

Examples of suitable oxidizing agents include chemical compounds which contain a metal ion which can change its valence, and also include non-metallic compounds. Examples are ammonium peroxydisulfate [$(NH_4)_2S_2O_8$], potassium iodate ($KIO_3$), iron (III) chloride (Fe $Cl_3$), sodium persulfate [$Na_2S_2O_8$], potassium persulfate [$K_2S_2O_8$], potassium dichromate ($K_2Cr_2O_7$), hydrogen peroxide ($H_2O_2$) (e.g., 30% solution in water), chromium trioxide [$CrO_3$], sodium chlorate [$Na_2ClO_3$], ammonium dichromate [$(NH_4)_2Cr_2O_7$], $(NH_4)_2Ce(NO_3)_6$, $Ce(SO_4)_2$, and the like.

The oxidizing agents can be dissolved in polar organic or inorganic solvents which are inert towards the particular oxidants used. Typical solvents are water, alcohols, acetonitrile, acetic acid, acetone, amides, ethers and the like. Typical concentrations for the oxidant are within the range 0.1–1.0 molar.

In practicing the instant invention, auxiliary acids including, but not limited to, mineral, carboxylic and sulfonic may be used in conjunction with the aforementioned inorganic or organic oxidants. Thus, acids such as sulfuric, hydrochloric, acetic, trifluoroacetic, methanesulfonic or trifluoromethanesulfonic can be employed. Such acid may be co-dissolved with the oxidant in a suitable solvent used as a solvent for the oxidant. Such added acids may be preferred but are not necessary in conjunction with the preferred oxidants. When auxiliary acids are added to the system, they are added in amounts in the range 0.01 to 100 moles acid/mole oxidant.

The oxidizing agent is generally employed in an amount of from 0.01 to 3 mole (and preferably from 0.2 to 1 mole) per mole of the aromatic N-monomer.

The conditions of temperature and pressure under which the polymerization is performed can vary widely, and generally temperatures of from about $-20°$ to $100°$ C., preferably from about $0°$ to $30°$ C., will be employed. Temperatures of greater than $100°$ C. can be employed but can cause excessive thermal decomposition of the product and increased by-products (including homopolymer of the aromatic N-monomer, e.g., polyaniline homopolymer from aniline). Similarly, temperatures of less then $-20°$ C. can be used, but uneconomically slow reaction rates can result. The pressure is preferably selected to maintain the polymer and monomer feed in substantially liquid form in the polymerization zone, and generally pressures from about 0.1 to 1000 kPa, and preferably from about 1 to 100 kPa, will be employed. As the polymerization reaction is slightly exothermic, the polymerization zone will be generally provided with a cooling means, which can comprise any of the conventionally used devices for cooling liquid media (e.g., external or internal reactor cooling coils, feedstream indirect heat exchanger(s), reaction liquid recycle through a pump around heat exchanger, introduction of a quench fluid (e.g., a cooled solvent or gas), and the like). Cooling of the polymerization reaction liquid can also be effected by evaporative cooling, as by continuously, or intermittently, introducing a low-boiling solvent which is evaporated from the surface of the reaction liquid.

The polymerization reaction time can vary widely, depending on such factors as the size of the reactor, the type, amounts and notes of the feedstreams charged, the temperatures employed, and other factors. Generally, however, the polymerization will be conducted for a time of from about 0.1 to 24 hours, preferably from about 1 to 15 hours and more preferably from about 2 to 6 hours.

The grafting polymerization reaction is believed to be an oxidation reaction, and therefore, the reactants are preferably charged in the substantial absence of reducing agents such as hydroquinone, $NH_4OH$, hydrazine, and the like), as these materials may impede the desired grafting reaction.

The polymerization can be effected in the presence or absence of a solvent. For example, suitable solvents include hydrocarbon solvents such as aliphatics, cycloaliphatics, and aromatic hydrocarbon solvents, or halogenated versions of such solvents. Preferred are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Examples of such solvents are hexane, butane, pentane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane and trichloroethane.

Generally, from 0.01 to 500 moles, preferably from about 0.1 to 200 moles, and more preferably from 0.1 to 100 moles of aromatic N-monomer are charged to the polymerization zone per molar equivalent of reactive amine of the low $T_g$ amino-substituted polymer charged. The number of molar equivalents of reactive amine is equal to the moles of low $T_g$ amino-substituted polymer charged multiplied by the average number of reactive amine groups (i.e., primary or secondary amine groups) per molecule of the low $T_g$ amino-substituted polymer. For example, in a polymer containing an average of 0.8 reactive amine groups per polymer molecule, one mole of the polymer contains 0.8 molar equivalents of reactive amino groups, for the purposes of the above charge ratios.

The concentration of aromatic-N-monomer units produced in the product polymer can vary widely. For lubricating oil additives, the grafted polymer will preferably contain from about 0.5 to 30 wt. %, and more preferably from about 1 to 10 wt. % monomer units derived from the aromatic N-monomer (e.g., aniline), and for electronic applications, the grafted polymer will preferably contain from about 20 to 80 wt. %, preferably 30 to 50 wt. % of monomer units derived from the aromatic-N-monomer (e.g., aniline).

The polymerization grafting reaction can be effected in a continuous, semi-continuous or batchwise manner, and can be carried out in any conventional reactor, such as in one or more stirred tank reactor, tubular reactor, and the like.

In the grafting process, the low $T_g$ amino-substituted polymer and aromatic N-monomer are contacted with the acidic oxidizing solution. Under these conditions, the low $T_g$ amino-substituted polymer is unable to homopolymerize as it lacks the polymerizable group. The aromatic N-monomer, however, readily polymerizes under these reaction conditions. The slow addition of the low $T_g$ amino-substituted polymer already mixed with acidic oxiding solution or the slow addition of the aromatic N-monomer mixed with low $T_g$ amino-substituted polymer to the acidic oxiding solution is essential for the prevention of significant homopolymerization of aromatic N-monomer.

The grafting reaction of low $T_g$ amino-substituted polymers with aromatic N-monomers in accordance with this invention can be illustrated by the grafting of aniline onto an amino-norbornyl substituted ethylene propylene polymer. Attempts to establish the exact structure of polyaniline have been difficult. The redox chemistry of polyaniline is complicated by the large number of possible chemical structures for the polyaniline in an idealized structure, the polymer's graft segment units formed in this invention can be written as follows:

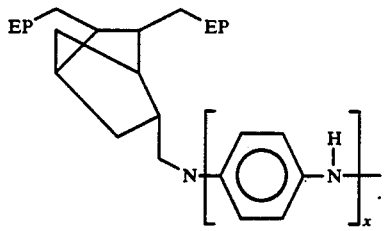

where x is a number of from 1 to 100,000, preferably from 2 to 1,000, and wherein EP represents the balance of the polymer, which can contain an average of one or more such graft unit per polymer chain. However, under the preparation conditions of this invention, the structure of the grafted polyaniline polymer units can also be represented as follows:

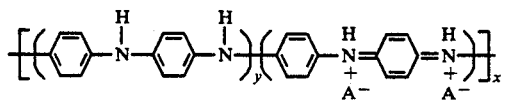

The above structure can also be seen as the polysemiquinone radical cation form:

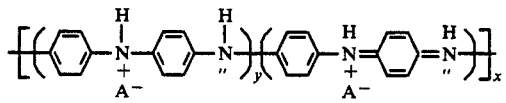

wherein A is an anion (e.g., chloride anion), x is as defined above, and y is 0.5 which polymer form will be herein called an emeraldine salt. The polymer can be reacted with 0.1M ammonium hydroxide to get polyaniline in the emeraldine base form.

The emeraldine base form of the grafted polymer of the present invention alternating reduced and oxidized repeat units can be presented as follows:

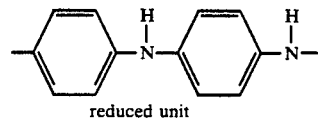
reduced unit

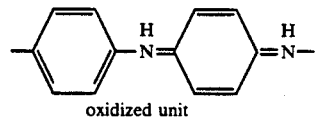
oxidized unit

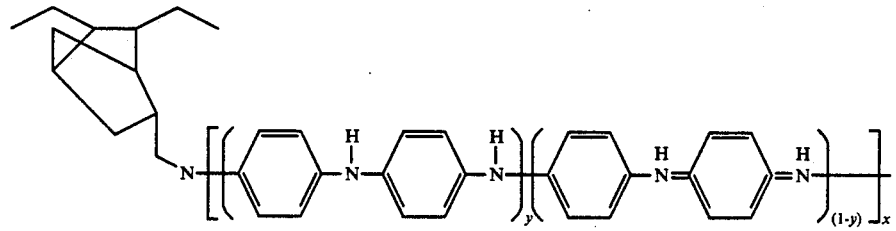

where again x and y are as defined above.

Furthermore, the repeating units can be protonated by Bronsted acid such as aqueous HCl to produce or regenerate the corresponding salt as shown above.

The solubility of the grafted polymers prepared by the process of this invention depends on the amount of aromatic N-monomer incorporated into the total polymer, the total polymer molecular weight, type of polymer backbone and other factors. The grafted polymers of this invention having from 1-10 wt. % of aromatic N-monomer graft units are soluble in common organic solvents (including non-polar organic solvents) The grafted polymers of this invention having at least about 20 wt. % (e.g., 25 wt. % to 80 wt. %) of aromatic N-monomer graft units possess electlrically conducting properties, and are genrally not-oil soluble.

The polymers of this invention also find utility in applications such as thermoplastic conductivity systems, soluble conductive systems capable of being cast into coherent films, additives for conventional thermoplastics, and the like. The novel polymers have high electrical conductivities; in general from 10 to $10^{-6} >$ohm$^{-1}$cm$^{-1}$, and good mechanical properties. The electrical conductivity (in ohms$^{-1}$cm$^{-1}$) is determined by applying conductive copper contacts to the film and carrying out the measurement by the two-point method.

The polyaniline-grafted nitrogen-functionalized polymers of this invention can be converted into shaped articles by any of the conventional methods already used in the melt-shaping of polyolefins, such as extrusion, molding, and the like. The polymers can also be deposited on surfaces (e.g., fibers, metals, polymer surfaces, etc.) in a suitable solvent followed by removal of the solvent, as by evaporation The polymers of this invention find utility in the construction of light-weight rechargable storage batteries, electrochromic display devices, electo-optical switching and memory devices, neutron detectors, solar energy cells, ion exchangers, non-linear optic devices, molecule-based electronics, anti-static treatment of plastics and textiles. They constitute an advance in the art, especially where good mechanical properties of the components, coupled with low specific gravity and well-balanced properties, are important.

The grafted polymer products of this invention will generally comprise a mixture of homopolymer of a selected aromatic N-containing monomer (e.g., polyaniline homopolymer), the grafted polymer and the ungrafted amino-substituted elastomeric starting polymer. Generally, it is not essential to remove the poly(aromatic N-containing monomer) homopolymer from the grafted polymer product for electronic and other above described applications. The grafted polymer products of this invention are processable, for example, by compression molding, extrusion, and the like. In contrast simple blends of poly(aromatic N-containing monomer) homopolymer and amino-substituted elastomeric polymer produce considerable processing difficulties, principally the inability to obtain homogeneous blends and processed products of uniform properties.

This invention will be further understood by reference to the following examples, wherein all parts are parts by weight, unless otherwise noted and which include preferred embodiments of the invention.

EXAMPLE 6

(a) 13.2 ml of 5-norbornene-2-methylamine (NBMA) (12.8 gm) was added 200 ml of hexane. To this solution was added 81 ml. of a 20% solution of diisobutyl aluminum hydride (DIBAL-H) in hexane at 20° C. under a nitrogen blanket over a period of 90 seconds. The resultant solution containing the masked nitrogen-containing monomer (MNCM) was introduced into the polymerization reactor to prepare a low $T_g$ amino-substituted EP interpolymer. The conditions of polymerization are shown in Table V and the results in Table VI:

TABLE V

| Conditions | |
|---|---|
| Reactor = | 3.875 liter (CFSTR) |
| Temperature = | 30° C. |
| Pressure = | 500 kPa gauge |
| Agitation = | 1200 rpm |
| Residence Time = | 9 min. |
| Al/V Molar Ratio = | 10 for catalyst compounds |
| Feeds | |
| Hexane = | 4.22 kg/hr. |
| Ethylene = | 67.5 g/hr. |
| Propylene = | 162.1 g/hr. |
| VCl$_4$ = | 0.646 g/hr. |
| EADC = | 4.25 g/hr. |
| Hydrogen = | 120 w ppm on ethylene |
| NCM (masked as above) = | 1.917 g/hr. |

TABLE VI

| Polymerization Parameters | | Polymer Proportion | | |
|---|---|---|---|---|
| Rate (g/hr) | Catalyst Efficiency (g/g) | Ethylene Content (wt %) | $M_L$ (1 + 4) (125° C.) | MNCM (conv %) |
| 173 | 267 | 36.8 | 6.7 | 92 |

The resulting low $T_g$ amino-substituted ethylene propylene polymer was isolated, deashed and precipitated by steam stripping of the solvent. According to the following procedure, 500 ml of the hexane solution was mixed with a 10% solution of dil. HCl in 500 ml of 1:1 water and isopropyl alcohol at 65° C. for 1 hour. At the end of this time, the water layer was removed and the supernatant hexane layer was washed with 500 ml of water. the pH of the hexane layer was adjusted to 7 by aqueous sodium hydroxide, and the polymer recovered by evaporation of the solvent.

(b) Aniline was grafted on the amino-substituted ethylene propylene polymer obtained in 6(a) above as follows: a solution of 8.4 g (0.037 mol) ammonium peroxydisulfate in 50 ml 1M HCl was stirred at room temperature. The amino-substituted polymer prepared in 6(a) (1.85 g) was dissolved in 50 ml THF and was mixed with 3.8 g (0.041 mol) of aniline, to provide an aniline: reactive amine equivalent molar charge ratio of about 310:1. This solution was added to an aqueous solution with stirring for a period of 5 min. Ten to fifteen minutes after the reactants were mixed, the solution started to show a green tint and became intense green as a solid polymer started precipitating out. The reaction was slightly exothermic and the temperature of the reaction went up 50° C. from that of room temperature. The solution was stirred for two more hours, and the precipitate was collected on a Buchner funnel. It was then washed until the filtrate became colorless (using about 300 ml of 1M HCl). The solid obtained was dried under vacuum at 60° C. The resulting grafted polymer product was virtually black. Attempts to compression mold the product resulted in a thin, flexible, black film (about 0.4 mm in thickness) which could be flexed without breaking.

(c) The film prepared in (b) above was suspended in 1M HCl for 24 hours to ensure doping. The film was pressed between two copper cylinders of radius 0.5 centimeters and resistance was measured using a Fluka 77 multimeter. This measurement constitutes a two probe conductivity measurement and provided a conductivity of $1.4 \times 10^{-2}$ S/cm The wt. % nitrogen analysis showed the grafted polymer product to contain 9.51 wt. % nitrogen (this compares to a theoretical nitrogen level of 12.85 wt. % nitrogen for homopolymer of aniline which could have been produced after doping.) The analysis of wt. % nitrogen and the observed high level of conductivity indicates that the grafted polymer product contained polyaniline groups of about 74 wt. %.

The low $T_g$ amino-substituted polymers can be grafted with the aromatic nitrogen-containing monomer alone or as a polymer mixture containing the low $T_g$ aminos substituted polymer admixed with one or more non-amino-substituted polymers, which can be the same or different polymer backbone(s). Such non-amino-substituted polymers employed in such polymer mixtures with the amino-substituted polymers can vary widely, and can comprise, e.g., homopolymers, copolymer and higher interpolymers, block and tapered polymers, thermoplastic, thermosetting, elastomeric and non-elastomeric. Typical such polymers include polyolefins, polyesters, polyamides, polycarbonates, and the like. Such polymer mixtures can comprise polymer blends, solutions or articles (such as fibers, fabrics, carpets, molded articles, and the like). For example, a low $T_g$ amino-substituted interpolymer (such as amino-substituted ethylene alpha-olefin interpolymer) can be blended with another polyolefin (such as polypropylene, polyethylene, and the like), the blend formed into useful articles and the articles thereafter contacted with an aromatic-nitrogen-containing monomer as hereinafter described, to graft polymer segments derived from the aromatic nitrogen-containing monomer onto at least a portion of the reactive amino-groups in the article. In one embodiment, a fiber material (e.g., fiber, thread, textiles, carpets, and the like) can be formed from such polymer blends and thereafter treated to graft the poly(aromatic-nitrogen) segments thereon, to form a fiber material having electrical conductive properties. Molded, extruded or otherwise formed articles containing the electrically conductive polymers of this invention can be also employed in electrical and magnetic shielding articles in protection of electrically and magnetically sensitive devices e.g., as a portion of the cladding employed in electrical cables in containers for computer or other electronic equipment, and the like.

From the foregoing description, one skilled in the art can easily ascertain the essential characteristics of this invention and, without departing from the spirit and scope thereof, make various changes and modifications of the invention to adapt it to various usages and conditions.

What is claimed is:

1. A method for forming a nitrogen-containing polymer which comprises (a) providing an oil soluble amino-substituted polymer derived from at least one polymer chain monomer and at least one monomer having a general formula of:

$$R^1(X)_n$$

wherein $R^1$ comprises an ethylenically unsaturated hydrocarbyl radical, n is an integer of at least 1, and X is selected from the group consisting of imino, primary amino, secondary amino, and cyano groups, having a glass transition temperature ($T_g$) of not greater than about $+25°$ C. and containing reactive amine groups, and (b) contacting said amino-substituted polymer with at least one aromatic nitrogen-containing monomer under polymerization conditions to graft said amino-substituted polymer with aromatic nitrogen-containing polymer segments, wherein said aromatic monomer comprises at least one aromatic compound containing at least one $-NH(R^a)$ aromatic ring substituent, wherein $R^a$ is hydrogen or hydrocarbyl.

2. The method of claim 1 wherein said amino-substituted polymer comprises an amino-substituted interpolymer and is formed by a process which comprises:
(a) reacting at a temperature of less than 60° C. (i) said at least one monomer, with (ii) a masking agent comprising at least one metallic compound to form the corresponding masked nitrogen-containing monomer; and
(b) polymerizing polymer chain monomers with said masked, nitrogen-containing monomer to produce a polymerization product comprising a polymer chain including masked, nitrogen-containing monomer; and
(c) deashing said polymerization product and recovering said amino-substituted interpolymer.

3. The method of claim 2, wherein said masking agent comprises a non-halogenated metallic compound and said amino-substituted polymer comprises less than 0.10% by weight of halogen.

4. The method of claim 2, where in said amino-substituted polymer comprises less than 0.03% by weight of halogen.

5. The method of claim 2, wherein $R^1$ contains less than 25 carbon atoms.

6. The method of claim 5, wherein $R^1$ contains not greater than 16 carbon atoms.

7. The method of claim 5, wherein $R^1$ is selected from the group consisting of radicals from alpha-ole fins, norbornene and alkyl-substituted norbornenes.

8. The method of claim 5, wherein said $R^1$ is selected from the group consisting of vinyl and allyl radicals.

9. The method of claim 6, wherein $R^1$ is selected from the group consisting of radicals derived from alpha-olefins having the general formula of:

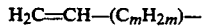

wherein m is an integer of at least one.

10. The method of claim 9, wherein $R^1$ is selected from the group consisting of radicals from norbornene and homologues of norbornene having the general formula of:

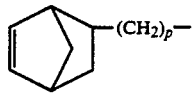

wherein p is an integer of at least one.

11. The method of claim 5, wherein said nitrogen-containing monomer is selected from the group consisting of norbornene methyl amines and norbornene carboximines.

12. The method of claim 11, wherein said norbornene methylamine is 5-norbornene-2-methylamine.

13. The method of claim 2, wherein said non-halogenated metallic compound is an organometallic compound of the formula:

$$M(Y)_r$$

wherein M is a member selected from Group IB, IIA, IIB, IIIA, IVA, and the transition metals elements, Y is at least one of $R^2$, $R^3$, $R^4$ and $R^5$, wherein $R^2$–$R^5$ are independently selected from the group consisting of hydrogen, and non-halogenated $C_1$–$C_{16}$ hydrocarbyl radicals, and non-halogenated $C_1$–$C_{16}$ hydrocarbyloxy radicals and r is an integer of from 1 to 4.

14. The method of claim 13, wherein said non-halogenated $C_1$–$C_{16}$ radicals are selected from the group consisting of $C_1$–$C_{16}$ alkyl, $C_1$–$C_{16}$ aryl, and $C_1$–$C_{16}$ alkoxy.

15. The method of claim 14, wherein $R^2$–$R^5$ are non-halogenated members independently selected from the group consisting of hydrogen, methyl, ethyl, propyl, isopropyl, butyl, isobutyl, tertiary butyl, pentyl, hexyl, phenyl, tolyl, ethylphenyl, naphthyl, methoxy, ethoxy, propoxy, hexoxy, pentoxy, phenoxy, methylphenoxy, iso-butoxy and tertiary butoxy.

16. The method of claim 13, wherein M is an element selected from the group consisting of aluminum, magnesium, and zinc.

17. The method of claim 16, wherein said organometallic compound is selected from the group consisting of triisobutylaluminum, triethylaluminum, diisobutyl aluminum hydride, diethylzinc, and di-n-hexylmagnesium.

18. The method of claim 17, wherein said organometallic compound is selected from the group consisting of triisobutylaluminum, triethylaluminum, and diisobutyl aluminum hydride.

19. The method of claim 2, comprising polymerizing said polymer chain monomers with said masked, nitrogen-containing monomer in the presence of a said polymerization catalyst.

20. The method of claim 19, wherein said polymerization catalyst comprises at least one member selected from the group consisting of vanadium compounds, titanium compounds and zirconium compounds.

21. The method of claim 20, wherein said vanadium compounds include a member selected from the group consisting of vanadium halides, vanadium oxyhalide and vanadium salts of beta-diketonates.

22. The method of claim 21, wherein said vanadium halide is vanadium tetrachloride.

23. The method of claim 22, wherein said vanadium oxyhalide compound has a general formula of $$VOX_n(OR^a)_{3-n}$$

where n is an integer of 2 or 3, $R^a$ is a hydrocarbyl radical and X is a halogen.

24. The method of claim 23, wherein said $R^a$ hydrocarbyl radical is selected from the group consisting of alkyl, phenyl, and benzyl radicals.

25. The method of claim 24, wherein said alkyl radicals of said vanadium oxyhalide compound are members selected from the group consisting of $C_1$–$C_{10}$ alkyls.

26. The method of claim 2, wherein said polymer chain monomers are a mixture consisting essentially of ethylene and propylene.

27. The method of claim 26, wherein said polymer chain comprises about 20 wt. % to 90 wt. % ethylene and about 10 wt. % to 80 wt. % propylene by total weight of said amino-substituted polymer.

28. The method of claim 2, wherein said masked, nitrogen-containing monomer is present in a range of about 0.1 wt. % to 40 wt. % by total weight of said amino-substituted interpolymer.

29. The method of claim 28, wherein said amount of said masked, nitrogen-containing monomer is within the range of about 0.1 wt. % to 10 wt. % by total weight of said amino-substituted interpolymer.

30. The method according to claim 2, wherein said masked amino-substituted interpolymer is contacted with an aqueous liquid in said de-ashing step.

31. The method according to claim 30, wherein said polymerization product comprises said masked, nitrogen-containing polymer, polymerization catalyst, and unreacted nitrogen-containing monomer, and said de-ashing is effected by contacting said polymerization product with a liquid selected from the group consisting of water, aqueous mineral acid solutions, and aqueous mineral base solutions.

32. The method of any of claims 1–31, wherein said aromatic monomer comprises at least one compound of the formula:

$$Ar[NH(R^a)]_y$$

wherein Ar is substituted or unsubstituted aromatic radical, $R^a$ is hydrogen or hydrocarbyl and y is an integer of at least 1.

33. The method of claim 32, wherein said aromatic monomer comprises at least one compound of the formula $$Ar'[NH(R^b)]_{y'}$$

wherein Ar' is

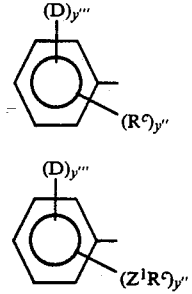

wherein $R^c$ in each instance in which it appears is independently $C_1$ to $C_{12}$ alkyl, y' is an integer of from 1 to 4, y" in an integer of from 0 to 4, y'" is an integer of from 0 to 4, D in each instance in which it appears is independently Cl, Br or I, $R^b$ is hydrogen or $C_1$ to $C_{20}$ alkyl, and Z' is a branched or straight chain alkylene group which can contain one or more —O— or —S— chain atom, with the proviso that the sum of y'+y"+y'" is from 1 to 5.

34. The method of claim 33, wherein said aromatic monomer comprises at least one member selected from the group consisting of aniline, o-toluidine, m-toluidine, o-ethylaniline, and m-ethylaniline.

35. The method according to claim 1, wherein said amino-substituted polymer has a number average molecular weight of from 500 to 500,000.

36. The method according to claim 2, wherein said amino-substituted interpolymer has a molecular weight distribution of from 1.0 to 20.

37. The method according to claim 2, wherein said amino-substituted interpolymer has a number average molecular weight of from 800 to 5,000.

38. The method according to claim 37, wherein said amino-substituted interpolymer has a molecular weight distribution of from 1.5 to 15.

39. The method according to any of claims 35-37, wherein said aromatic monomer comprises at least one aromatic compound containing at least one -NH($R^a$) aromatic ring substituent, wherein $R^a$ is hydrogen or hydrocarbyl.

40. The method according to claim 39 wherein said aromatic monomer comprises at least one compound of the formula:

Ar[NH($R^a$)]$_y$ 

wherein Ar is substituted or unsubstituted aromatic radical, $R^a$ is hydrogen or hydrocarbyl and y is an integer of at least 1.

41. The method according to claim 40, wherein said aromatic monomer of at least one compound of the formula Ar'[NH($R^b$)]$_{y'}$ 

wherein Ar' is

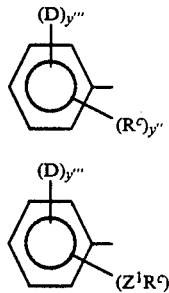

wherein $R^c$ in each instance in which it appears is independently $C_1$ to $C_{12}$ alkyl, y' is an integer of from 1 to 4, y" in an integer of from 0 to 4, y''' is an integer of from 0 to 4, D in each instance in which it appears is independently Cl, Br or I, $R^b$ is hydrogen or $C_1$ to $C_{20}$ alkyl, and Z' is a branched or straight chain alkylene group which can contain one or more —O— or —S— chain atoms, with the proviso that the sum of y'+y"+y''' is from 1 to 5.

42. The method according to claim 41, wherein said aromatic monomer comprises at least one member selected from the group consisting of aniline, o-toluidine, m-toluidine, o-ethylaniline, and m-ethylaniline.

43. The method according to claim 35, wherein said amino-substituted interpolymer comprises an amino-substituted ethylene propylene copolymer or terpolymer.

44. A method for forming a nitrogen-containing polymer which comprises (a) providing an oil soluble amino-substituted polymer derived from at least one polymer chain monomer and at least one monomer having a general formula of:

$R^1(X)_n$ 

wherein $R^1$ comprises an ethylenically unsaturated hydrocarbyl radical, n is an integer of at least 1, and X is selected from the group consisting of imino, primary amino, secondary amino, and cyano groups, having a $T_g$ of not greater than about 0° C. and containing reactive amine groups, and (b) contacting said amino-substituted polymer with at least one aromatic nitrogen-containing monomer under polymerization conditions to graft said amino-substituted polymer with aromatic nitrogen-containing polymer segments, wherein said aromatic monomer comprises at least one aromatic compound containing at least one —NH($R^a$) aromatic ring substituent, wherein $R^a$ is hydrogen or hydrocarbyl.

45. The method of claim 44 wherein said amino-substituted polymer has a $T_g$ of not greater than about $-15°$ C.

46. The method of claim 45 wherein said amino-substituted polymer has a $T_g$ of from about $-100$ to $+20°$ C.

47. The method of claim 45 wherein said amino-substituted polymer has a $T_g$ of from about $-75$ to $-20°$ C.

48. The method o f claim 44 wherein said amino-substituted polymer is characterized by a C:N elemental ratio of at least about 10:1.

49. The method of claim 48 wherein said C:N ratio is at least about 100:1.

50. The method of claim 48 wherein said C:N ratio is from about 10:1 to 2000:1.

51. The method of claim 48 wherein said C:N ratio is from about 100:1 to 900:1.

52. The method of any one of claims 44 to 51 wherein said amino-substituted polymer comprises a polymer selected from the group consisting of amino-substituted homopolymers of $C_3$ t o $C_{25}$ alpha-olefins, amino-substituted copolymers of $C_2$ to $C_{25}$ alpha-olefins, and amino-substituted terpolymers and higher interpolymers of $C_2$ to $C_{25}$ alpha-olefins.

53. The method of claim 52 wherein the amino-substituted polymer contains within its structure an average of at least 0.5 primary or secondary amine groups per polymer chain.

54. The method of claim 53 wherein the amino-substituted polymer contains within its structure an average of from 0.5 to 20 reactive amine groups per polymer chain.

* * * * *